(12) United States Patent
Stuart

(10) Patent No.: US 8,738,492 B1
(45) Date of Patent: May 27, 2014

(54) DISPLAYING STATUS OF AND FACILITATING COMPLIANCE WITH REGULATORY REQUIREMENTS RELATED TO MUNICIPAL BONDS

(71) Applicant: Paula Stuart, Orlando, FL (US)

(72) Inventor: Paula Stuart, Orlando, FL (US)

(73) Assignee: Digital Assurance Certification L.L.C., Orlando, FL (US)

( * ) Notice: Subject to any disclaimer, the term of this patent is extended or adjusted under 35 U.S.C. 154(b) by 0 days.

(21) Appl. No.: 13/632,660

(22) Filed: Oct. 1, 2012

(51) Int. Cl.
*G06Q 40/00* (2012.01)

(52) U.S. Cl.
CPC ...................................... *G06Q 40/00* (2013.01)
USPC ........................................................... 705/35

(58) Field of Classification Search
CPC ....................................................... G06Q 40/00
USPC ................................................ 705/35, 38, 44
See application file for complete search history.

(56) References Cited

U.S. PATENT DOCUMENTS

| | | | |
|---|---|---|---|
| 4,566,066 A | 1/1986 | Towers | 364/408 |
| 5,809,483 A | 9/1998 | Broka et al. | 705/37 |
| 5,893,079 A | 4/1999 | Cwenar | 705/36 |
| 5,915,209 A | 6/1999 | Lawrence | 455/31.2 |
| 6,161,099 A | 12/2000 | Harrington et al. | 705/37 |
| 6,381,585 B1 | 4/2002 | Maples et al. | 705/36 |
| 6,446,047 B1 | 9/2002 | Brier et al. | 705/35 |
| 6,557,009 B1 | 4/2003 | Singer et al. | 707/104.1 |
| 6,876,309 B1 | 4/2005 | Lawrence | 340/825.26 |
| 7,155,408 B2 * | 12/2006 | Hebbar et al. | 705/35 |
| 7,191,148 B1 | 3/2007 | Butcher | 705/35 |
| 7,343,339 B2 | 3/2008 | Harrison, Jr. et al. | 705/37 |
| 7,376,604 B1 | 5/2008 | Butcher | 705/35 |
| 7,801,791 B2 * | 9/2010 | Hebbar et al. | 705/36 R |
| 7,966,248 B2 | 6/2011 | O'Connor et al. | 705/37 |
| 8,010,439 B1 | 8/2011 | Davis | 705/37 |
| 8,165,937 B1 * | 4/2012 | Hebbar et al. | 705/35 |
| 8,271,366 B2 * | 9/2012 | Coglianese et al. | 705/35 |
| 2001/0039524 A1 | 11/2001 | Harrison, Jr. et al. | 705/35 |
| 2001/0051879 A1 | 12/2001 | Johnson et al. | 705/2 |
| 2001/0051935 A1 | 12/2001 | Sugiura | 706/12 |
| 2002/0016758 A1 | 2/2002 | Grigsby | 705/36 |
| 2002/0091621 A1* | 7/2002 | Conklin et al. | 705/37 |
| 2002/0099646 A1 | 7/2002 | Agarwal et al. | 705/37 |

(Continued)

OTHER PUBLICATIONS

SEC, "Strengthening Practices for the Underwriting of Municipal Securities," Mar. 19, 2012, National Examination Risk Alert, vol. II, Issue 3, pp. 1-8.*

(Continued)

*Primary Examiner* — Kenneth Bartley
(74) *Attorney, Agent, or Firm* — Pillsbury Winthrop Shaw Pittman LLP

(57) ABSTRACT

The disclosure relates to an integrated platform for obtaining and managing information and documents relating to regulatory compliance, determining compliance obligations and compliance actions, graphically providing representations of and/or tools for facilitating such compliance, including historical, current and future compliance requirements of municipal bonds and other securities and associated information. The integrated platform may receive selections of compliance templates used to determine compliance with disclosure requirements of municipal bonds, obtain securities-related information related to a municipal bond (including information related to the bond issuer), automatically populate a disclosure document with required information based on the selected compliance template related to a municipal bond using securities-related information obtained by the system, provide an indication of required information based on the compliance template, automatically determine whether provided information satisfies regulatory requirements, and graphically illustrate current and historical compliance of the municipal bond.

28 Claims, 13 Drawing Sheets

(56) References Cited

U.S. PATENT DOCUMENTS

| | | | |
|---|---|---|---|
| 2002/0128954 A1 | 9/2002 | Evans | 705/37 |
| 2002/0152155 A1 | 10/2002 | Greenwood et al. | 705/38 |
| 2002/0156719 A1 | 10/2002 | Finebaum et al. | 705/37 |
| 2003/0040941 A1 | 2/2003 | Whitworth | 705/4 |
| 2003/0046205 A1 | 3/2003 | Brier et al. | 705/35 |
| 2003/0046206 A1 | 3/2003 | Sato | 705/35 |
| 2003/0050879 A1 | 3/2003 | Rosen et al. | 705/35 |
| 2003/0061082 A1 | 3/2003 | Stoutenburg et al. | 705/7 |
| 2003/0093351 A1 | 5/2003 | Sarabanchong | 705/36 |
| 2003/0110106 A1 | 6/2003 | Deshpande et al. | 705/36 |
| 2003/0120578 A1* | 6/2003 | Newman | 705/36 |
| 2003/0126055 A1 | 7/2003 | Thal et al. | 705/36 |
| 2003/0149654 A1 | 8/2003 | Harrington et al. | 705/36 |
| 2003/0163405 A1 | 8/2003 | Wiener et al. | 705/36 |
| 2003/0167221 A1 | 9/2003 | Kochansky | 705/36 |
| 2003/0204464 A1* | 10/2003 | Hebbar et al. | 705/36 |
| 2003/0225655 A1 | 12/2003 | Hughes, Jr. et al. | 705/36 |
| 2004/0199451 A1 | 10/2004 | Benning et al. | 75/37 |
| 2005/0027575 A1* | 2/2005 | Amitabh et al. | 705/8 |
| 2005/0071265 A1 | 3/2005 | Nishimaki | 705/38 |
| 2005/0091135 A1* | 4/2005 | Britton | 705/35 |
| 2005/0097030 A1 | 5/2005 | Lawrence | 705/37 |
| 2005/0144114 A1* | 6/2005 | Ruggieri et al. | 705/37 |
| 2005/0187857 A1 | 8/2005 | Tull | 705/37 |
| 2005/0187862 A1* | 8/2005 | Dheer et al. | 705/39 |
| 2006/0259316 A1* | 11/2006 | Breslin et al. | 705/1 |
| 2006/0271459 A1 | 11/2006 | Lange | 705/35 |
| 2006/0277133 A1* | 12/2006 | Hebbar et al. | 705/35 |
| 2007/0073776 A1 | 3/2007 | Kalalian et al. | 707/104 |
| 2007/0136174 A1* | 6/2007 | Hebbar et al. | 705/36 R |
| 2007/0168218 A1 | 7/2007 | Harrison, Jr. | 705/1 |
| 2009/0119191 A1* | 5/2009 | Stuart et al. | 705/30 |
| 2011/0184928 A1 | 7/2011 | Vadon et al. | 707/706 |
| 2011/0246391 A1* | 10/2011 | Henderson | 705/36 R |
| 2012/0030136 A1* | 2/2012 | Rosenberg | 705/36 R |
| 2012/0203712 A1* | 8/2012 | Fennell | 705/36 T |
| 2012/0284157 A1* | 11/2012 | Bienstock | 705/35 |
| 2012/0296788 A1 | 11/2012 | Hebbar et al. | 705/35 |
| 2013/0006889 A1* | 1/2013 | Bienstock et al. | 705/36 R |
| 2013/0198109 A1* | 8/2013 | Rosenberg | 705/36 R |
| 2013/0212042 A1* | 8/2013 | Rosenberg | 705/36 R |

OTHER PUBLICATIONS

IBM, "IBM Cognos Financial Statement Reporting (FSR): Automated CAFR reporting for state and local governments," IBM Software, May 2011, pp. 1-8.*

Securities and Exchange Commission letter addressed to Vinson & Elkins LLP dated Sep. 21, 2001, 2 pages.

Hume, Lynn, "SEC: Broker-Dealers Can Use DAC Instead of NRMSIRs for Rule 15c2-12", reprinted from *The Bond Buyer*, Sep. 25, 2001, 1 page.

Resnick, Amy B., "Market Disclosure System Termed Seriously Flawed", *Bond Buyer*, New York, NY, Feb. 21, 2002, vol. 339, Issue 31329, p. 4.

"National Federation of Municipal Analysts; *Recommended Best Practices in Disclosure for Variable Rate and Short-Term Securities*", Feb. 2003, 50 pages.

"CDI System Approval", MSRB Reports, vol. 17, No. 2, Jun. 1997, 3 pages.

"Rule 15c2-12—Municipal Securities Disclosure", *Securities Lawyer's Deskbook*, The University of Cincinnati College of Law, copyright 1998-2006, 8 pages.

MAC Insights, Edition IV—Amended, A Publication of the Municipal Advisory Council of Texas, Sep. 1998, pp. 1-12.

MSRB Forum on Disclosure, Washington, D.C., Nov. 11-12, 1998, 10 pages.

MAC Insights, Edition V, A Publication of the Municipal Advisory Council of Texas, Feb. 1999, pp. 1-16.

"NCSHA's Pilot Program on Electronic Disclosure Gets Under Way", *The Bond Buyer*, May 19, 1999, p. 22.

Municipal Advisory Council of Texas letter dated May 21, 1999, 4 pages.

"Centralizing Disclosure?", by Lynn Hume, *The Bond Buyer*, The Daily Newspaper of Public Finance, Sep. 10, 1999, 2 pages.

Municipal Advisory Council of Texas, $45^{th}$ Annual Meeting Presentation, Oct. 15, 1999, 13 pages.

MAC Insights, Edition IX, A Publication of the Municipal Advisory Council of Texas, Mar. 2000, pp. 1-12.

MAC Insights, Edition XI, A Publication of the Municipal Advisory Council of Texas, Sep. 2000, pp. 1-8.

DAC Web Service Screenshots (Welcome to DAC, DAC Search, Trustee Portfolio), copyright 2000, 7 pages.

MSRB Discussion Paper on Disclosure in the Municipal Securities Market, copyright 2000 Municipal Securities Rulemaking Board, 17 pages.

"DAC Pushes 'Soup-to-Nuts' Disclosure System; Talks to Ruth", by Lynn Hume, *The Bond Buyer*, Feb. 26, 2001, 3 pages.

"Filing with SEC; Electronic Submission of Official Statements, Advance Refunding Documents and Forms G-36(OS) and G-36 (ARD) to the MSRB", *MSRB*, vol. 21, No. 2, Jul. 2001, pp. 37-42.

Memorandum from The Bond Market Association to Secondary Market Disclosure Task Force—NRMSIR Subcommittee dated Aug. 21, 2001, 5 pages.

MAC Insights, Edition XV, A Publication of the Municipal Advisory Council of Texas, Sep. 2001, pp. 1-12.

"2001 Municipal Market Roundtable 'Secondary Market Disclosure for the $21^{st}$ Century'", United States Securities and Exchange Commission, Division of Market Regulation, Office of Municipal Securities, Nov. 14, 2001, New York City, 68 pages.

MAC Insights, Edition XVI, A Publication of the Municipal Advisory Council of Texas, Dec. 2001, pp. 1-12.

MAC Insights, Edition XVII, A Publication of the Municipal Advisory Council of Texas, Mar. 2002, pp. 1-12.

Digital Assurance Certification (DAC) Marketing Brochure, copyright 2000, 62 pages.

Rulemaking for EDGAR System, Final Rule, Securities and Exchange Commission, Release Nos. 33-7855; 34-42712 et al., Apr. 24, 2000, pp. 1-18 and 27-39.

Apache Week, "Using User Authentication", Oct. 18, 1996, apacheweek.com/features/userauth, 6 pages.

"Filing with SEC; Changes Proposed to the CDI System", *MSRB Reports*, vol. 15, No. 2, Jul. 1995, 3 pages.

"Issuers and Dealers Look for Way to Make Cusips Easier to Obtain", by Lynn Hume, *Bond Buyer*, vol. 341, Issue 31456, New York, New York, Aug. 23, 2002, 3 pages.

Simonsen, Bill, et at., "Municipal Bond Issuance: Is There Evidence of a Principal-Agent Problem?", *Public Budgeting & Finance*, vol. 18, No. 4, Winter 1998, pp. 71-100 (31 pages).

Investment Company Institute, "Re: NFMA Draft Recommended Best Practices in Disclosure for Variable Rate and Short-Term Securities", Nov. 1, 2002, 7 pages.

* cited by examiner

500

BOND ISSUER 410

| 502 | 504 | 506 | 508 | 510 | 512 |

HISTORICAL COMPLIANCE

STATUS LEGEND 520

| 522A | 522D | 522G | 522J |
| 522B | 522E | 522H | ⋮ |
| 522C | 522F | 522I | 522N |

| 524 | 526 | 528 |

| BONDS CURRENTLY OUTSTANDING | | | |
|---|---|---|---|
| BOND DESCRIPTION | YEAR 1 | YEAR 2 | YEAR (N) |
| MUNI BOND 532A | 522A...N | 522A...N | 522A...N |
| MUNI BOND 532B | 522A...N | 522A...N | 522A...N |
| ⋮ | ⋮ | ⋮ | ⋮ |
| MUNI BOND 532N | 522A...N | 522A...N | 522A...N |

| BONDS NO LONGER OUTSTANDING | | | |
|---|---|---|---|
| BOND DESCRIPTION | YEAR 1 | YEAR 2 | YEAR (N) |
| MUNI BOND 542A | 522A...N | 522A...N | 522A...N |
| MUNI BOND 542B | 522A...N | 522A...N | 522A...N |
| ⋮ | ⋮ | ⋮ | ⋮ |
| MUNI BOND 542N | 522A...N | 522A...N | 522A...N |

BOND ISSUER 410

| 502 | 504 | 506 | 508 | 510 | 512 |

FILING REQUIREMENTS SCREEN

| BONDS CURRENTLY OUTSTANDING | | | |
|---|---|---|---|
| BOND DESCRIPTION | DESCR | TYPE | DOC |
| MUNI BOND 532A | 612A | 614A | 616A |
| MUNI BOND 532B | 612B | 614B | 616B |
| ⋮ | ⋮ | ⋮ | ⋮ |
| MUNI BOND 532N | 612N | 614N | 616N |

| BONDS NO LONGER OUTSTANDING | | | |
|---|---|---|---|
| BOND DESCRIPTION | DESCR | TYPE | DOC |
| MUNI BOND 542A | 622A | 624A | 626A |
| MUNI BOND 542B | 622B | 624B | 626B |
| ⋮ | ⋮ | ⋮ | ⋮ |
| MUNI BOND 542N | 622N | 624N | 626N |

FIG. 6

BOND ISSUER 410

| 502 | 504 | 506 | 508 | 510 | 512 |

CHECKLIST

| BOND DESCR | DOCTYPE | TITLE | REQ | DUE | INTERVAL |
|---|---|---|---|---|---|
| 532A | 712A | 714A | 716A | 718A | 720A |
| 532A | 722A | 724A | 726A | 728A | 730A |
| 532B | 712B | 714B | 716B | 718B | 720B |
| 532B | 722B | 724B | 726B | 728B | 730B |
| ⋮ | ⋮ | ⋮ | ⋮ | ⋮ | ⋮ |
| 532N | 712N | 714N | 716N | 718N | 720N |
| 532N | 722N | 724N | 726N | 728N | 730N |

MUNI BOND 532A

| 1102 | 1104 | 1106 | 1108 | 1110 | 1112 | 1114 | 1116 |

CHECKLIST

| DOC TYPE | FILING TITLE | FILING REQ | DUE DATE | FILING INTERVAL |
|---|---|---|---|---|
| 1430A | 1432A | 1434A | 1436A | 1438A |
| 1430B | 1432B | 1434B | 1436B | 1438B |
| ⋮ | ⋮ | ⋮ | ⋮ | ⋮ |
| 1430N | 1432N | 1434N | 1436N | 1438N |

MUNI BOND 532A

| 1102 | 1104 | 1106 | 1108 | 1110 | 1112 | 1114 | 1116 |

CUSIPS

| CUSIP | MATURITY DATE | MATURITY SIZE | CREDIT SUPPORT |
|---|---|---|---|
| 1530A | 1532A | 1534A | 1536A |
| 1530B | 1532B | 1534B | 1536B |
| ⋮ | ⋮ | ⋮ | ⋮ |
| 1530N | 1532N | 1534N | 1536N |

FIG. 15

DISPLAYING STATUS OF AND FACILITATING COMPLIANCE WITH REGULATORY REQUIREMENTS RELATED TO MUNICIPAL BONDS

FIELD OF THE INVENTION

The invention relates to an integrated platform for obtaining and managing information and documents relating to regulatory compliance, determining compliance obligations and compliance actions, graphically providing representations of and/or tools for facilitating such compliance, including historical, current and future compliance requirements of municipal bonds and other securities and associated information.

BACKGROUND OF THE INVENTION

Securities and Exchange Commission ("SEC") Rule 15c2-12 under the Securities Exchange Act of 1934 sets forth certain obligations of underwriters to receive, review and disseminate official statements prepared by issuers of most primary offerings of municipal securities such as municipal bonds, underwriters to obtain continuing disclosure agreements from issuers and other obligated persons to provide material event disclosures and annual financial information on a continuing basis, and broker-dealers to have access to such continuing disclosure in order to make recommendations of municipal securities in the secondary market.

Although Rule 15c2-12 does not explicitly regulate issuers such as municipalities directly, it is in their best interest to comply with the obligations set forth by the Rule in order to allow underwriters and broker-dealers to offer/purchase their municipal bonds in the primary and secondary markets. Rule 15c2-12 expressly regulates underwriters and broker-dealers. It is therefore in their best interest to keep track of the various requirements by issuers.

However, keeping track of the various regulatory requirements and required information associated with individual ones of the various requirements can be difficult. Different municipal bonds may have different requirements, timelines, and intervals for which disclosures are to be made. Furthermore, keeping track of material events as they occur can also be difficult. The problem may be exacerbated because information may be spread across different third party databases such as Nationally Recognized Municipal Securities Information Repositories ("NRMSIRs"), State Information Repositories ("SIRs"), which collectively include Municipal Data Repositories ("MDRs"), and others.

SUMMARY OF THE INVENTION

One aspect of the invention relates to an integrated platform for obtaining and managing information and documents relating to regulatory compliance, determining compliance obligations and compliance actions, graphically providing representations of and/or tools for facilitating such compliance, including historical, current and future compliance requirements of municipal bonds and other securities and associated information. The regulatory compliance may include requirements governed by SEC Rule 15c2-12.

One aspect of the invention relates to systems and methods for gathering information and documents held in multiple data sources relating to issuers of municipal securities, aggregating the gathered information, and determining whether the information and documents related to a bond or series of a bond is in compliance, non-compliance, or lacks a requirement to comply with applicable governmental regulations related to the bond or series of a bond. The determination of compliance, non-compliance, or lack of requirement to comply may be made with respect to historical compliance (e.g., over the preceding five years), current compliance, and/or future compliance.

The system may provide a graphical representation of the determined compliance, non-compliance, or lack of requirement to comply. For example, the graphical representation may graphically indicate compliance, non-compliance, or lack of requirement to comply during the preceding five years, current year, and/or future year.

The system may provide various securities-related information and documents to the user such that the user may independently verify whether an issuer or obligor has satisfied its disclosure requirements, communications regarding the issuers' disclosure requirements and templates that are provided to the issuer in order to comply with its contractual obligations, and an integrated platform for managing and checking such templates. Initially, the system may include one or more databases and document servers, which may store various information and documents related to municipal securities and other information. The information and documents may relate to annual audits of the issuer, certain operating data, event notices deemed material by the issuer, failure to provide securities-related information, disclosure templates, communications, and other pertinent information.

The information may be provided to comply with the contractual obligations of the issuer/obligor to the bond holders and to provide Brokers and Dealers with a procedure for meeting regulatory requirements that provide prompt notice of events relating to bonds they recommend to customers. The system may aggregate and test/compare such information against criteria to determine whether an issuer has met its contractual obligations, a user may then be provided with a graphical representation of whether an issuer has complied with its disclosure requirements as set forth in its contractual obligations.

Additionally, the system may establish a communication area and presentation of documents and other information related to the bond issue, which may be needed by a user to conduct independent assessments in compliance with governmental regulations of brokers and dealers, and/or for general information use by a user. In addition, the system may facilitate external communication with an obligor via an e-mail server which provides notices regarding pending requests, rating events, BILP rating events, news, and/or other information.

The systems and methods to facilitate compliance with regulatory requirements by providing an integrated platform that may, without limitation, receive selections of compliance templates used to determine compliance with disclosure requirements of municipal bonds, obtain securities-related information related to a municipal bond (including information related to the bond issuer), automatically populate a disclosure document with required information based on the selected compliance template related to a municipal bond using securities-related information obtained by the system, provide an indication of required information based on the compliance template, automatically determine whether provided information satisfies regulatory requirements, and graphically illustrate current and historical compliance of the municipal bond. The integrated platform therefore presents various users or entities with a unified interface (or set of interfaces) by which to automatically populate, obtain, supply, and graphically view compliance with various regulatory requirements related to municipal bonds.

Different users may benefit in different ways by using the integrated platform. For example, bond issuers may use the integrated platform to ensure that they provide information or that disclosures are automatically generated that will be in compliance with regulatory requirements governed by SEC Rule 15 c2-12. Broker-dealers may use the integrated platform to ensure that they are in compliance with SEC Rule 15 c2-12 by purchasing municipal bonds that have made the requisite disclosures. Compliance officers may use the system to ensure that broker-dealers have purchased municipal bonds that have made the requisite disclosures. Others may also beneficially use the integrated platform.

The system may include a compliance server, a computing device, a third party information provider, third party databases, and/or other components. The compliance server may include one or more processors configured to execute one or more modules such as a storage module, a user interface module, a compliance checking module, a compliance verification module, a disclosure generator module, a communication module, an information aggregator module, and/or other modules.

The storage module may be configured to obtain stored regulatory requirements related to securities issued by securities issuers, criteria that define required information specific to individual ones of the regulatory requirements, and securities-related information associated with individual ones of a plurality of bond issuers.

In some embodiments, the criteria may be stored using one or more selectable compliance templates that specify the criteria. A compliance template may be related to a municipal bond that is currently governed a regulatory requirement such as an annual financial information disclosure requirement. In some embodiments, a single compliance template may include information for different requirements such as an annual financial information disclosure requirement, a material event notice disclosure requirement, and/or other regulatory requirements. In some embodiments, a single compliance template may include information for only a single requirement. For example, a single compliance template may be stored that includes criteria specifying required information in relation to an annual financial information disclosure requirement while another single compliance template may be stored that includes criteria specifying required information in relation to a material event notice requirement.

In some embodiments, the user interface module may be configured to provide the integrated platform, which may include one or more user interfaces for the user to provide, obtain, view, and select compliance templates in relation to a municipal bond. The user interface may display a compliance template for selection by the user when the user is viewing an interface that displays information for the municipal bond. Upon selection of the compliance template, the user interface may cause the compliance server to automatically generate required disclosure documents, determine whether information available for the municipal bond is sufficient for compliance, communicate indications of whether the available information is sufficient for compliance, prompt the user for additional information, and/or perform other tasks related to facilitating compliance with the annual financial information disclosure requirement.

A user may select a compliance template related to a status of a municipal bond in order to automatically generate a disclosure document that complies with the disclosure requirement specified by the selected compliance template, determine whether information input by the user or otherwise obtained by the compliance server is sufficient to comply with a relevant regulatory requirement specified by the selected compliance template, and/or perform other tasks related to facilitating compliance with the disclosure requirement.

In some embodiments, the user interface module may provide graphical indications of whether a municipal bond is in compliance with regulatory requirements. In some embodiments, the user interface module may provide historical compliance of the municipal bond, which may graphically display whether a municipal bond was in compliance with regulatory requirements in a time period. The historical compliance may be grouped by time periods such as years such that compliance (or non-compliance) in past years is graphically displayed. Various other modules of the compliance server may facilitate the graphical and other displays of the integrated platform provided by the user interface module.

For example, the compliance checking module may be configured to determine that a security issued by a bond issuer is subject to one or regulatory requirements based on the security issued by the bond issuer and the stored plurality of regulatory requirements. The compliance checking module may obtain one or more stored compliance templates related to a municipal bond and determine whether the municipal bond is subject to a regulatory requirement based on the obtained one or more compliance templates.

The compliance verification module may be configured to determine whether the municipal bond is in compliance with the regulatory requirements. In some embodiments, the compliance verification module may obtain one or more disclosures associated with the security issued by the bond issuer and one or more criteria that define required information specific to the one or more regulatory requirements. For example, the compliance verification module may obtain certain financial information related to a municipal bond to determine whether the obtained financial information includes all information required in an annual financial information required disclosure. To make this determination, the compliance verification module may compare information included in the one or more disclosures with the one or more criteria and determine whether the municipal bond issued by the bond issuer is in compliance with the one or more regulatory requirements based on the comparison.

In some embodiments, compliance verification module may determine historical compliance of a municipal bond based on a preceding time period such as a preceding five years. In this manner, compliance verification module may determine whether a municipal bond has been in compliance with regulatory requirements in the past.

The disclosure generator module may be configured to obtain securities-related information related to a municipal bond, obtain a compliance template related to the municipal bond, and automatically generate a disclosure document that satisfies the disclosure requirement criteria specified by the compliance template.

The communication module may be configured to facilitate communication between various users of the system such as bond issuers, broker-dealers, analysts, and/or other users. The communication module may communicate notifications such as incoming event notices, emails, and/or other information related to a bond issuer or municipal bond.

The information aggregator module may be configured to obtain different kinds of information related to a municipal bond and/or a bond issuer. For example, the information aggregator module may obtain financial information such as revenues, event information such as changes in credit or other financial ratings, and/or other information. The information aggregator module may obtain the information from various sources such as, for example, a bond issuer, a broker-dealer, NRMSIRs, SIDs, MDRs, third party information providers such as credit services (e.g., MOODY'S), information services (e.g., BLOOMBERG FINANCE), and/or other sources. The compliance server may communicate various information and user interfaces to computing devices used to interact with the compliance server.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates a user interface for displaying historical compliance of securities issued by a security issuer, according to an aspect of the invention.

FIG. 6 illustrates a user interface for displaying filing requirements of securities issued by a security issuer, according to an aspect of the invention.

FIG. 7 illustrates a user interface for displaying checklists of disclosure requirements of securities issued by a security issuer, according to an aspect of the invention.

FIG. 14 illustrates a user interface for displaying a checklist of disclosure requirements related to a security issued by a security issuer, according to an aspect of the invention.

FIG. 15 illustrates a user interface for displaying CUSIPs related to a security issued by a security issuer, according to an aspect of the invention.

DETAILED DESCRIPTION OF THE INVENTION

Figure 1:
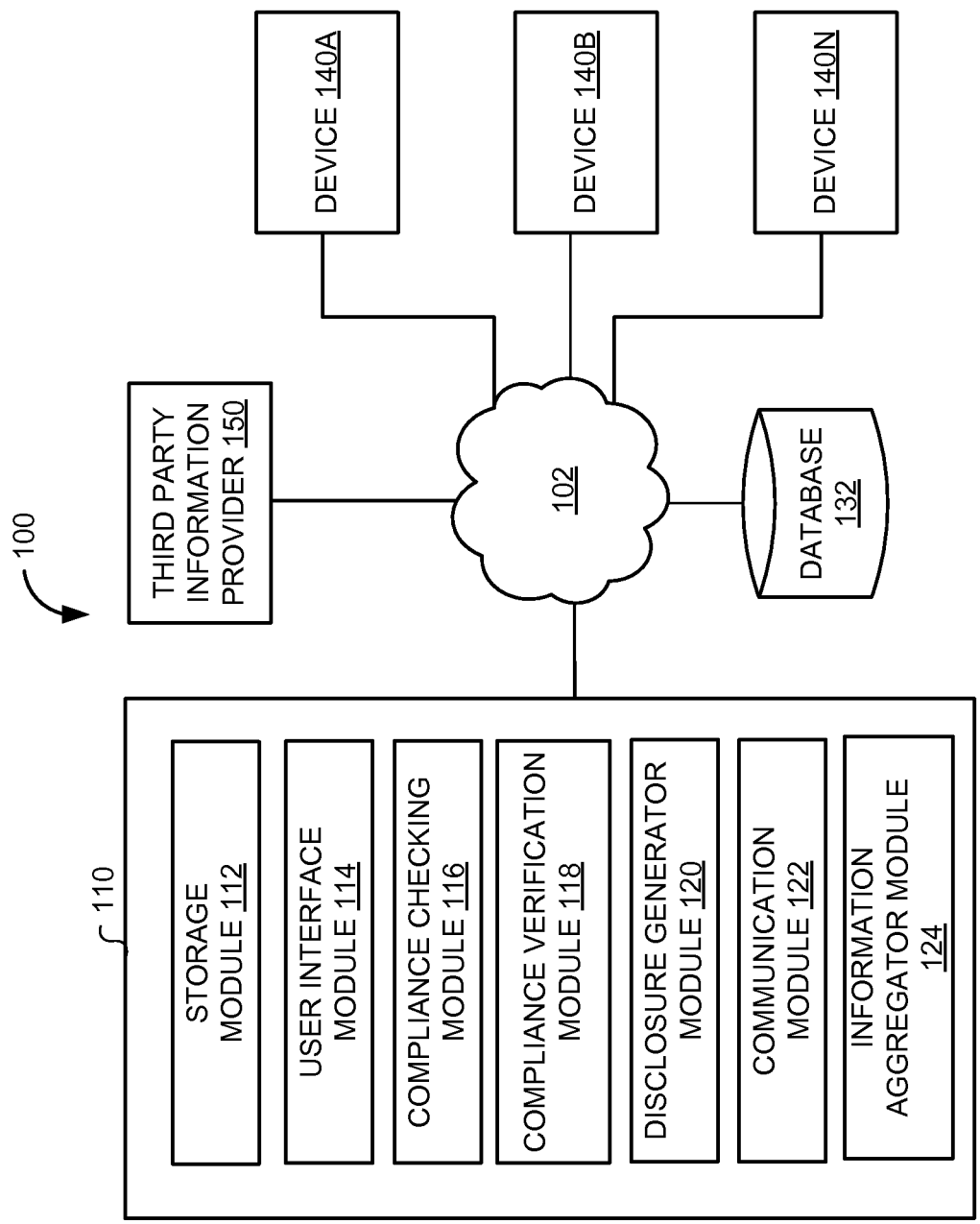
FIG. 1 illustrates a system of facilitating compliance with one or more regulatory requirements related to municipal bonds, according to an aspect of the invention.

FIG. 1 illustrates a system 100 of facilitating compliance with one or more regulatory requirements related to municipal bonds, according to an aspect of the invention. System 100 may include a compliance server 110, a computing device 140 (illustrated in FIG. 1 as computing devices 140A, 140B, . . . , 140N), a third party information provider 150, database 132, and/or other components. Compliance server 110 may include one or more processors configured to execute one or more modules such as a storage module 112, a user interface module 114, a compliance checking module 116, a compliance verification module 118, a disclosure generator module 120, a communication module 122, an information aggregator module 124, and/or other modules.

The storage module 112 may be configured to obtain stored regulatory requirements from a memory such as database 132 related to securities issued by securities issuers (also referred to herein as "bond issuers"), criteria that define required information specific to individual ones of the regulatory requirements, and securities-related information associated with individual ones of a plurality of bond issuers. In some embodiments, securities-related information associated with individual ones of a plurality of bond issuers may include information related to municipal bonds issued by a bond issuer and/or information related to the bond issuer. The regulatory requirements may include, for example, annual financial information, material event disclosure notices, and/or other information that may be required in relation to a municipal bond.

In some embodiments, the criteria may be stored using one or more selectable compliance templates that specify the criteria. A compliance template may be related to a municipal bond that is currently subject to an annual financial information disclosure requirement.

In some embodiments, compliance templates may be created and/or uploaded by various users. For example, a bond issuer (e.g., an employee or other user associated with the bond issuer) may review a continuing disclosure agreement (required by regulatory requirements) that obligates the bond issuer to make certain disclosures at certain times in relation to a municipal bond issued by the bond issuer. The bond issuer may create one or more compliance template that includes criteria that specifies all of the information requirements set forth in the continuing disclosure agreement.

In some embodiments, the compliance template may be created and stored in various formats such as, for example, a spreadsheet, a comma-separated values file, an extensible markup language format, and/or other format that can convey the criteria specified in a compliance template. Upon creation of the compliance template, the bond issuer may upload the compliance template using an interface provided by user interface module 114. Other users such as broker-dealers, compliance officers, users associated with compliance server 110, and/or others who have access to disclosure requirements may also create and/or upload compliance templates.

In some embodiments, a single compliance template may include information for different requirements such as an annual financial information disclosure requirement, a material event notice disclosure requirement, and/or other regulatory requirements. In some embodiments, a single compliance template may include information for only a single requirement. For example, a single compliance template may be stored that includes criteria specifying required information in relation to an annual financial information disclosure requirement while another single compliance template may be stored that includes criteria specifying required information in relation to a material event notice requirement.

In some embodiments, criteria may include general criteria such as, for example, a description of the disclosure requirement, a type of document associated with the disclosure requirement, a filing requirement description (which may be obtained from a continuing disclosure agreement), a due date by which the disclosure must be made, a filing interval that specifies a frequency with which the disclosure is required (e.g., annually), and/or other general criteria that specifies a disclosure requirement.

In some embodiments, criteria may include specific criteria such as, for example, particular a header, a field, and/or other information that can specify or accommodate information that may be required to be disclosed. A header may include a title line that follows with information required to be disclosed by a continuing disclosure agreement or other requirement. For example a town or city may be required to provide a list of the ten largest businesses within the municipality, the tax revenue they generate or the amount of employment they provide in the municipality. This type of information is important in allowing investors to determine whether the municipality is likely to default or continue to meet its debt obligations. A field may include a summary of information either in chart form, table form, text, and/or other information that follows a header displaying information. The system may verify that information is present under the header. In some embodiments, the system may verify that information is contained in the field. In some embodiments, the system may obtain the information from the field without validating the information.

In some embodiments, general and/or specific criteria may be different for different types of disclosure requirements and different types of bonds. For example, a compliance template related to an annual financial information disclosure requirement may have different disclosure requirements and therefore different criteria than a compliance template related to a material event notice requirement. Similarly, a compliance template related to a sewer bond may have different disclosure requirements and therefore different criteria than a compliance template related to a road improvement bond.

User interface module 114 may be configured to provide the integrated platform, which may include one or more user interfaces for the user to provide, obtain, view, and select compliance templates in relation to a municipal bond. Examples of such user interfaces are illustrated in FIGS. 4-19.

In some embodiments, a user interface may display a compliance template for selection by the user when the user is viewing an interface that displays information for the municipal bond. Upon selection of the compliance template, the user interface may cause compliance server 110 to automatically generate required disclosure documents, determine whether information available for the municipal bond is sufficient for compliance, communicate indications of whether the available information is sufficient for compliance, prompt the user for additional information, and/or perform other tasks related to facilitating compliance with the annual financial information disclosure requirement.

In some embodiments, a user may select a compliance template related to a status of a municipal bond in order to automatically generate a disclosure document that complies with the disclosure requirement specified by the selected compliance template, determine whether information input by the user or otherwise obtained by compliance server 110 is sufficient to comply with a relevant regulatory requirement specified by the selected compliance template, and/or perform other tasks related to facilitating compliance with the disclosure requirement.

In some embodiments, user interface module 114 may provide graphical indications of whether a municipal bond is in compliance with regulatory requirements. The graphical indications may include different shapes, sizes, colors, text, and/or other differentiating features to indicate different statuses of the municipal bond in relation to compliance with the regulatory financial disclosure requirements. For example and without limitation, a check mark may indicate compliance, an "X" mark may indicate non-compliance, and a "?" may indicate further information is required to be in compliance.

In some embodiments, user interface module 114 may provide historical compliance of the municipal bond, which may graphically display whether a municipal bond was in compliance with regulatory requirements in a given time period. The historical compliance may be grouped by selectable time periods such as years such that compliance (or non-compliance) in previous or current years is graphically displayed. In some embodiments, user interface module 114 provides a five-year (or other selectable time period) historical compliance where a status such as compliance or non-compliance of a municipal bond in each of the past five-year period is graphically displayed. In particular, a green check mark may indicate that the municipal bond was in compliance during a particular year while a red "X" mark may indicate that the municipal bond was not in compliance during another year. In some embodiments, when no requirements are necessary, a "N/A" or other indication maybe provided to indicate non-applicability of any disclosure requirements.

Various other modules of the compliance server 110 may facilitate the graphical and other displays of the integrated platform provided by user interface module 114. For example, the compliance checking module 116 may be configured to determine that a municipal bond is subject to one or regulatory requirements based on the stored plurality of regulatory requirements.

In some embodiments, compliance checking module 116 may obtain one or more stored compliance templates related to a municipal bond and determine whether the municipal bond is subject to a regulatory requirement based on the obtained one or more compliance templates. For example, compliance checking module 116 may obtain one or compliance templates associated with a municipal bond via storage module 112. The one or more compliance templates may individually or together specify regulatory requirements and corresponding criteria that specify securities-related information required by each regulatory requirement.

For example, compliance checking module 116 may determine that the municipal bond is subject to an annual financial information disclosure due annually and that the next annual disclosure is imminently due based on information stored in a memory such as database 132.

In some embodiments, compliance verification module 118 may be configured to determine whether the municipal bond is in compliance with the regulatory requirements. In some embodiments, compliance verification module 118 may obtain one or more disclosures associated with the security issued by the bond issuer and one or more criteria that define required information specific to the one or more regulatory requirements. For example, compliance verification module 118 may obtain certain financial information related to a municipal bond to determine whether the obtained financial information includes all information required in an annual financial information required disclosure. To make this determination, compliance verification module 118 may compare information included in the one or more disclosures with the one or more criteria and determine whether the municipal bond issued by the bond issuer is in compliance with the one or more regulatory requirements based on the comparison.

In some embodiments, compliance verification module 118 may determine historical compliance of a municipal bond and/or bond issuer based on a preceding time period such as a preceding five years. Compliance verification module 118 may obtain regulatory requirements related to a municipal bond and disclosures made by or on behalf of the bond issuer with respect to that bond. Compliance verification module 118 may determine whether the disclosures made complied with the disclosure requirements for that given time period. Compliance verification module 118 may repeat the process until time periods have been processed. For example, compliance verification module 118 may determine compliance as describe above for each of the five preceding years or other time period or range of dates. In this manner, compliance verification module 118 may determine whether a municipal bond has been in compliance with regulatory requirements in the past. The determination may be stored in a memory such as via storage module 112 and/or may be made on-demand such as from a request made via a user interface of user interface module 114.

In some embodiments, disclosure generator module 120 may be configured to obtain securities-related information related to a municipal bond, obtain a compliance template related to the municipal bond, and automatically generate a disclosure document that satisfies the disclosure requirement criteria specified by the compliance template using the obtained securities-related information. In some embodiments, disclosure generator module 120 may copy the compliance template and populate appropriate fields and values using the obtained securities-related information. In some embodiments, disclosure generator module 120 may generate a disclosure document based on the headers, fields, formatting instructions, and/or other information specified by the compliance template.

In some embodiments, the disclosure document may be generated in various formats such as, for example, Portable Document Format, spreadsheets, word processing documents, and/or other formats that can convey the securities-related information. In some embodiments, the compliance template may include formatting rules and/or other logic used by disclosure generator module 120 to format, place, or otherwise generate a disclosure document. The formatting rules and/or other logic may be included in the compliance template by the creator of the template.

In some embodiments, information aggregator module 124 may be configured to obtain different kinds of information related to a municipal bond and/or a bond issuer. For example, the information aggregator module may obtain financial information such as revenues, event information such as changes in credit or other financial ratings, and/or other information. The information aggregator module may obtain the information from various sources such as, for example, a bond issuer, a broker-dealer, third party information providers 150 such as credit services (e.g., MOODY'S), information services (e.g., BLOOMBERG FINANCE), third party databases (e.g, NRMSIRs, SIDs, MDRs), and/or other third party sources of information. The compliance server may communicate various information and user interfaces to computing devices used to interact with the compliance server.

Those having skill in the art will recognize that compliance server 110 and device 140 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of compliance server 110 and/or device 140. In one implementation, compliance server 110 and device 140 may each comprise a server device, a desktop computer, a laptop, a cell phone, a smart phone, a Personal Digital Assistant, a pocket PC, or other device.

The various components illustrated in FIG. 1 may be communicably coupled to one another via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Various other system configurations may be used as well. Furthermore, compliance server 110 may include other modules. For example, U.S. Pat. No. 7,155,408, issued Dec. 26, 2006, entitled "Method and Apparatus for Managing Information and Communications Related to Municipal Bonds and Other Securities," and U.S. Pat. No. 8,165,937, issued Apr. 24, 2012, entitled "System and Method for Managing Information Related to Securities and Securities Issuers," both of which are incorporated by reference herein in their entireties, describe systems and methods that may be used with or incorporated into systems and methods described herein.

Figure 2:
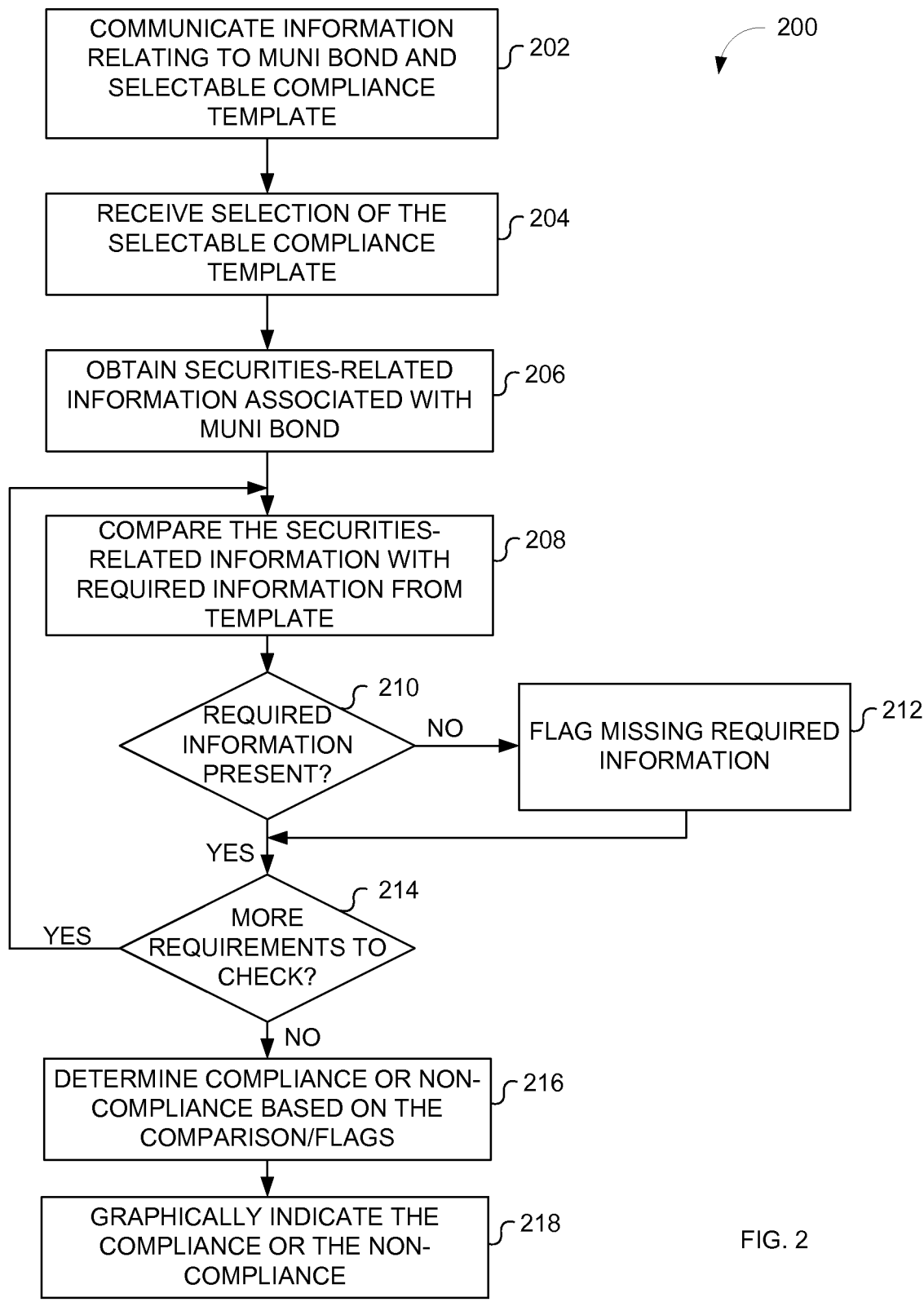
FIG. 2 illustrates a process of facilitating compliance with one or more regulatory requirements related to municipal bonds, according to an aspect of the invention.

FIG. 2 illustrates a process 200 of facilitating compliance with one or more regulatory requirements related to municipal bonds, according to an aspect of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, information related to status of a municipal bond and a selectable compliance template may be communicated. For example, compliance server 110 may display an interface that indicates a status such as a disclosure requirement being due for a municipal bond. Based on the status, compliance server 110 may communicate one or more selectable compliance templates used to determine compliance with the disclosure requirement being due.

In an operation 204, a selection of a selectable compliance template may be received. For example, a user may select a compliance template in order to determine disclosure requirements, automatically generate a disclosure document, and/or otherwise facilitate compliance with the disclosure requirement being due. From the selected compliance template, required information for the disclosure requirement may be obtained.

In an operation 206, securities-related information related to the municipal bond may be obtained. For example, the securities-related information may include financial information related to the municipal bond, event information related to a material event for the municipal bond, and/or other information related to the municipal bond may be obtained. The securities-related information may be obtained from various sources including, for example, the bond issuer (e.g., via the user interface), a broker-dealer, a third party information source, a third party database, and/or other information source that may provide securities-related information related to a municipal bond or a bond issuer.

In an operation 208, the required information may be compared with the securities-related information. For example, particular fields of information that may be required as determined from the compliance template may be compared to items of information contained in the securities-related information.

In an operation 210, a determination of whether the required information is included in the securities-related information may be made. If required information is missing, the missing information may be flagged in an operation 212.

In an operation 214, a determination of whether more required information remains to be checked. For example, the compliance template may include multiple items of required information. If more required information remains to be checked, processing may return to operation 208.

In an operation 216, a determination of whether the municipal bond is in compliance or non-compliance with the disclosure requirement may be made.

In an operation 218, the compliance or non-compliance may be graphically represented via the user interface. For example, when the municipal bond is in compliance, a green check mark may be displayed whereas when the municipal bond is not in compliance, a red "X" mark may be displayed in association with the municipal bond. In some embodiments, any missing items of information that were flagged may be graphically represented, thereby graphically indicating which, if any, items of required information is missing in order to facilitate provision of the missing information by the user.

Figure 3:
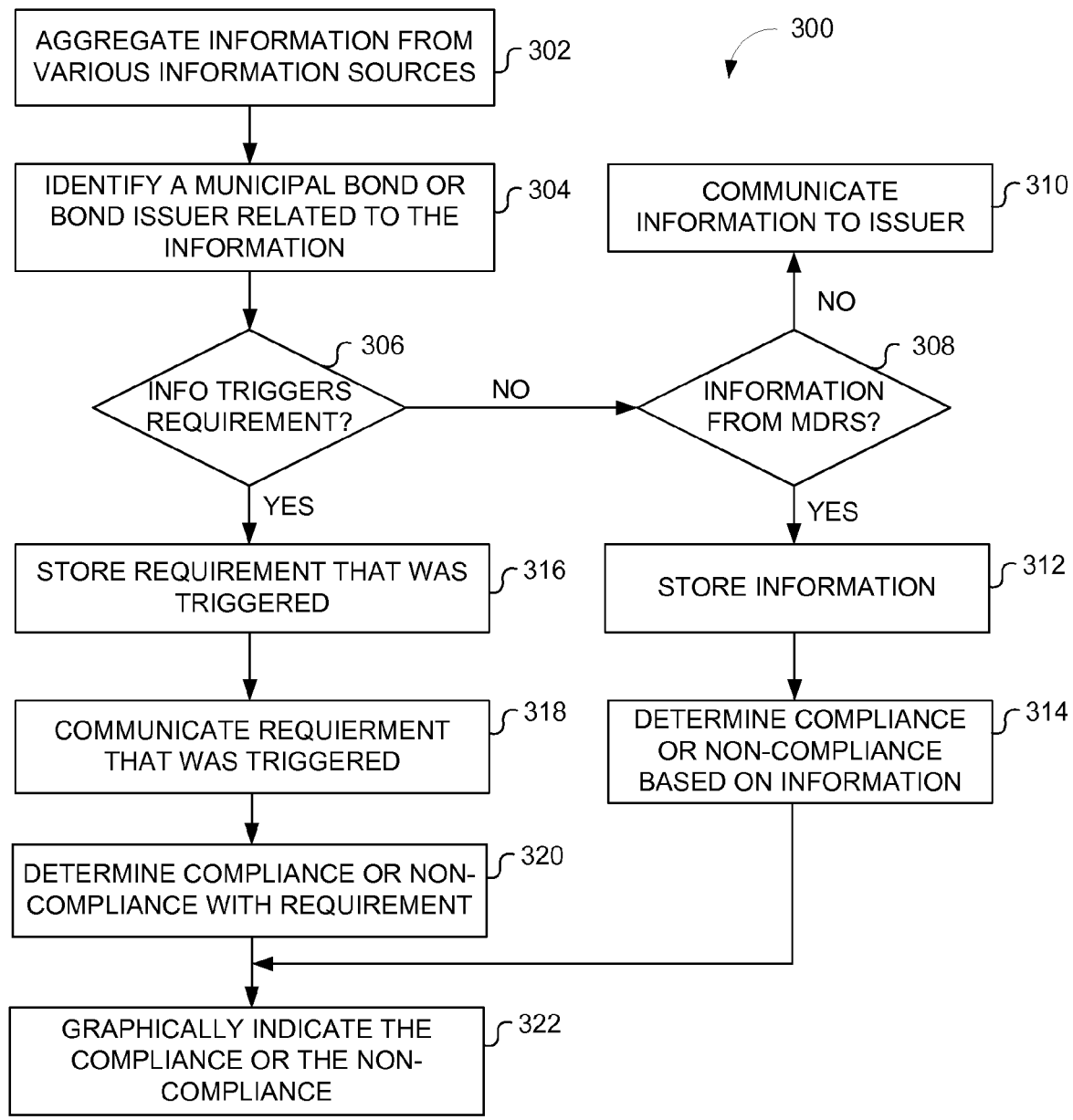
FIG. 3 illustrates a process of aggregating information from a plurality of information providers and facilitating compliance with one or more regulatory requirements related to municipal bonds based on the aggregated information, according to an aspect of the invention.

FIG. 3 illustrates a process 300 of aggregating information from a plurality of information providers and facilitating compliance with one or more regulatory requirements related to municipal bonds based on the aggregated information, according to an aspect of the invention.

In an operation 302, information related to a municipal bond or a bond issuer may be aggregated from various information sources, which may include third party information sources, third party databases, and/or other information sources that may provide information related to a municipal bond or bond issuer.

In an operation 304, a municipal bond or bond issuer may be identified to which the aggregated information is related. For example, information from a third party database may be identified or otherwise associated with a particular municipal bond or bond issuer. Such identification or association may be used to identify the municipal bond or bond issuer in operation 304. In another example, information from a third party information provider such as a credit rating agency may indicate a credit upgrade or downgrade for a bond issuer. The credit upgrade or downgrade may be used to identify the relevant municipal bond or bond issuer in operation 304.

In an operation 306, a determination of whether the aggregated information triggers a disclosure requirement may be made. For example, if the aggregated information includes a material event such as a credit upgrade or downgrade or other material event that may impact a municipal bond or bond issuer, a requirement to disclose the material event may be triggered.

If the disclosure requirement is not triggered, a determination of whether the aggregated information is from a third party database such as a Municipal Disclosure Repository in an operation 308. If the aggregated information is not from a MDR, the aggregated information may be communicated to the bond issuer or stored for later retrieval by the bond issuer. On the other hand, if the aggregated information is from a MDR, the aggregated information may be stored in an operation 312. For example, the aggregated information may include securities-related information from the bond issuer that was propagated to the MDR and subsequently obtained in operation 302 from the MDR.

In an operation 314, a determination of compliance or non-compliance with required disclosures may be made based on the aggregated information from the MDR. In an operation 322, the compliance or non-compliance may be graphically represented.

Returning to operation 306, if the disclosure requirement is triggered by the aggregated information, the triggered requirement may be stored in an operation 316. In an operation 318, the triggered requirement may be communicated to the bond issuer and/or others. For example, the bond issuer may be notified that a material event has occurred and a material event notice requirement has therefore been triggered.

In an operation 320, a determination of compliance or non-compliance with the triggered requirement may be made. For example, whether a material event notice was subsequently made in relation to the material event may be determined. In some embodiments, operation 320 may be processed at a predefined and configurable time after operation 318 in order to allow the bond issuer time to comply with the triggered requirement.

Figure 4:
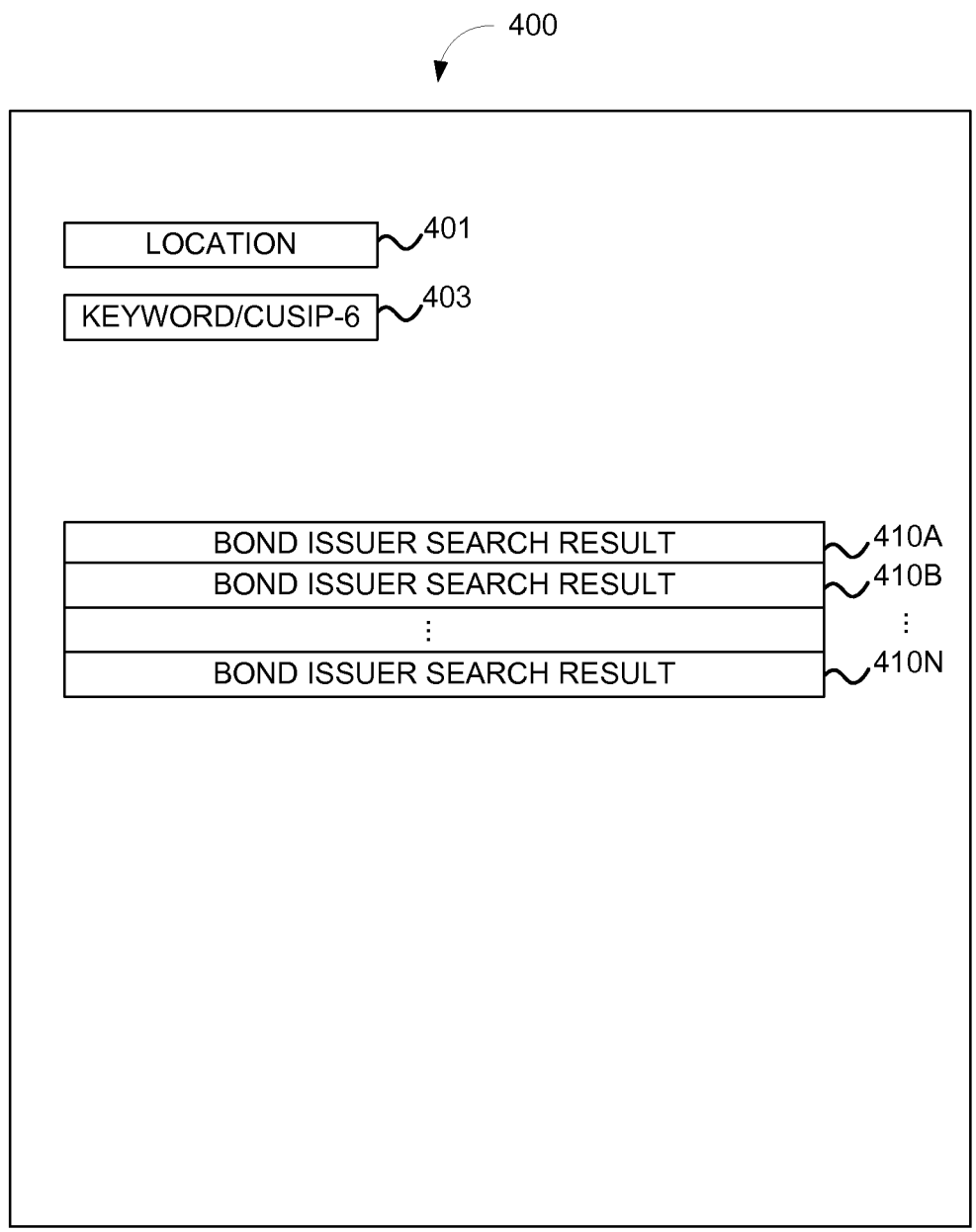
FIG. 4 illustrates a user interface for search results of securities issuers, according to an aspect of the invention.

FIG. 4 illustrates a user interface 400 for search results of securities issuers, according to an aspect of the invention. The user interfaces illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. Furthermore, in FIG. 4 and other drawing figures, various user interface components may be shared between the different user interfaces, as illustrated by reference numerals that are illustrated in more than one drawing figure.

User interface 400 and other interfaces described herein may be implemented as a web page communicated from compliance server 110 to other computing devices, an application such as a mobile application executing on the client that generates the interface based on information communicated from compliance server 110, and/or other interface. Whichever type of interface is used, compliance server 110 may communicate the data and/or formatting instructions related to the interface to the other device, causing the device to generate the various interfaces of FIG. 4 and other drawing figures. Furthermore, compliance server 110 may receive data from the other devices via the various interfaces, as would be appreciated.

User interface 400 may be used to search for and receive from compliance server 110 search results that include a listing of securities issuers 410 (illustrated in FIG. 4 as securities issuers 410A, 410B, . . . , 410N) that satisfy one or more search criteria. The search criteria may include a search by location, a search by keyword, CUSIP-6, and/or other criteria to search for securities issuers. The search criteria may be input via various input components such as, for example, search by location input 401, search by keyword/CUSIP-6 input 403, and/or other inputs. Search results 410 may each be selected to view information related to the selected securities issuer, as illustrated in the various interfaces of FIGS. 5-10.

The various user interfaces illustrated in FIGS. 5-10 may each include various navigation components used to navigate between different user interfaces 500-1000 of FIGS. 5-10. For example, navigation component 502 when selected may cause the display of user interface 500. Navigation component 504 when selected may cause the display of user interface 600. Navigation component 506 when selected may cause the display of user interface 700. Navigation component 508 when selected may cause the display of user interface 800. Navigation component 510 when selected may cause the display of user interface 900. Navigation component 512 when selected may cause the display of user interface 1000.

FIG. 5 illustrates a user interface 500 for displaying historical compliance of securities issued by a bond issuer 410, according to an aspect of the invention. User interface 500 may display currently outstanding securities (also referred to herein as "municipal bonds" or "muni bonds") 532 (illustrated in FIG. 5 as muni bonds 532A, 532B, . . . , 532N) issued by bond issuer 410 and a historical compliance of financial disclosure requirements related to the muni bonds 532, grouped by a time period such as a year (illustrated in FIG. 5 as time period 534A, 534B, . . . , 534N). For example, user interface 500 may display whether muni bonds 532 issued by bond issuer 410 were in compliance with regulatory requirements in each of the past last five years. In this example, time periods 534 may each represent a different year over the past five years in order to display whether muni bonds 532 were in compliance with regulatory requirements for those years, displaying a historical compliance of a particular municipal bond 532 issued by bond issuer 410.

In some embodiments, user interface 500 may display a compliance status of municipal bond 532 using compliance indicators 522 (illustrated in FIG. 5 as compliance indicators 522A, 522B, . . . , 522N). A compliance indicator 522 may indicate a compliance status of municipal bond 532 and include a graphical component such as an icon, a text component, and/or other display component that indicates the compliance status. In some embodiments, the compliance status may relate to a given time period such as a past or current year.

In some embodiments, user interface 500 may display a compliance indicator legend 520 that lists and describes compliance indicators 522. Each compliance indicator 522 may be include different colors, shapes, sizes, and/or other variable display features to differentiate it from another compliance indicator. In some embodiments, selection of (e.g., clicking on) a particular compliance indicator 522 may cause additional information associated with the compliance status indicated by the compliance indicator to be displayed.

In some embodiments, a compliance indicator 522 may be displayed, for example, as a green check mark that indicates that a municipal bond is active, a regulatory disclosure was required, and that the disclosure/filing occurred as required in a corresponding year. In some embodiments, selection of the green check mark may cause additional information to be presented such as, for example, in a pop-up screen (not illustrated in FIG. 5). The additional information may include a summary that includes a name of the obligor/bond issuer, the date range covered, information related to financial audit information, operating data documents, fiscal year end date, filing due date, filing satisfied date, and/or other information for each year or time period covered by the date range.

In some embodiments, a compliance indicator 522 may be displayed, for example, as a yellow check mark that indicates a historical filing in compliance with a regulatory disclosure that was required. In some embodiments, selection of the yellow check mark may cause additional information to be presented in a manner similar to selection of the green check mark. For the yellow check mark, the additional information may include additional historical filing information, name of the current obligor/bond issuer, date range covered, financial audit information, operating data documents, fiscal year end date, filing due date, filing satisfied date, and/or other information for each year or time period covered by the date range.

In some embodiments, a compliance indicator 522 may be displayed, for example, as a red "X" to indicate that a required disclosure was not made by the required deadline. In some embodiments, selection of the red "X" may cause additional information to be presented in a manner similar to selection of the green check mark. For the red "X," the additional information may include documents generated by the system related to the bond issuer's failure to provide information as required by disclosure requirements, any subsequent filing that later satisfies the failure to timely provide required information, and/or other information related to the failure to make a required disclosure by the required deadline.

In some embodiments, a compliance indicator 522 may be displayed, for example, as a red octagon (e.g., a "stop" sign) to indicate that the bond issuer 410 or obligor has taken corrective action such as making a required disclosure or the filing of a historical failure to provide.

In some embodiments, a compliance indicator 522 may be displayed, for example, a yellow caution sign with an exclamation point to indicate that compliance server 110 has detected that a corrective statement has been placed in a subsequent official statement.

In some embodiments, a compliance indicator 522 may be displayed, for example, as an orange icon with a clock to indicate that an analyst, other user, or system has generated a request for additional information from the bond issuer 410 about information provided by the bond issuer to comply with a disclosure requirement.

In some embodiments, a compliance indicator 522 may be displayed, for example, as a green icon with a clock to indicate that bond issuer 410 has satisfied a request for additional information.

In some embodiments, a compliance indicator 522 may be displayed, for example, a blue square to indicate when no disclosure requirement has been detected.

In some embodiments, a compliance indicator 522 may be displayed, for example, as a red icon with an exclamation point to indicate an anomaly in the database with respect to a database entry for internal corrective action.

The foregoing examples of compliance indicators 522 are non-limiting. Other types of icons, colors, graphical objects, etc., may be used to indicate different compliance statuses and other status information.

In some embodiments, user interface 500 may also include a listing of no longer outstanding securities 542 (illustrated in FIG. 5 as securities 542A, 542B, . . . , 542N). User interface 500 may display a historical compliance of securities 542 in a manner similar to muni bonds 532.

User interface 500 (and other user interfaces described herein) facilitates compliance with various disclosure requirements by displaying a compliance status of municipal bonds. Based on the compliance status, a user may add corrective actions such as making a required disclosure/filing, adding a corrective official statement, add a pending request for additional information, and/or perform other actions. For example, user interface 500 may include a navigation component 524 that when selected allows a user such as a bond issuer to add a disclosure to correct a failure to provide a required disclosure. Navigation component 526 when selected may allow a user such as the bond issuer to add a corrective official statement to correct a deficient or otherwise missing official statement. Navigation component 528 may allow a user such as an analyst to request additional information from the bond issuer in relation to a municipal bond. Thus, user interface 500 may provide an integrated interface to view compliance status, including historical compliance, and request or provide corrective actions or additional information thereby streamlining the compliance process.

Compliance server 110 may generate the historical compliance information by obtaining disclosures and other information made by bond issuer 410 for a given year or other time period, comparing regulatory requirements to the disclosures and other information, and determining whether the securities issuer complied with the regulatory requirements for the given year or other time period.

FIG. 6 illustrates a user interface 600 for displaying filing requirements of securities issued by a bond issuer 410, according to an aspect of the invention. User interface 600 may display a security issuer's continuing disclosure agreements related to currently outstanding muni bonds 532 and securities no longer outstanding 542. Each of the continuing disclosure agreements form the contractual basis for the requirement to provide securities-related information with respect to a related municipal bond 532 or 542 issued by bond issuer 410.

In some embodiments, as illustrated, for each currently outstanding municipal bond 532, user interface 600 may include a corresponding document description 612 (illustrated in FIG. 6 as document description 612A, 612B, . . . , 612N), a corresponding document type 614 (illustrated in FIG. 6 as document description 614A, 614B, . . . , 614N), a corresponding document download 616 (illustrated in FIG. 6 as document description 616A, 616B, . . . , 616N), and/or other information associated with a filing requirement related to a municipal bond 532 issued by bond issuer 410.

A document description 612 may describe the document listed in relation to a corresponding municipal bond 532 issued by bond issuer 410. For example, the document description may include descriptive text such as, without limitation, "Series 2011 Continuing Disclosure" and/or other information that identifies or describes the document or requirement being listed. Other document descriptions may be used and displayed as well depending on the document or requirement being listed.

A document type 614 may identify a type of document listed in relation to a corresponding municipal bond 532 issued by bond issuer 410. For example, the document type may include text such as "CDA" that identifies that the document or requirement being listed is a "CDA" document type, which conveys that the document or requirement being listed is a Continuing Disclosure Agreement. Other document types may be used and displayed as well depending on the type of document or requirement being listed.

A document download 616 when selected may cause the document or requirement being listed to be downloaded. In this manner, using the downloaded document and/or other information from user interface 600, a user may obtain information related to various regulatory requirements. For example, a broker-dealer may obtain the continuing disclosure agreement made by bond issuer 410 in relation to a municipal bond 532 so that a broker-dealer can show and be assured that the bond issuer 410 has agreed to be contractually obligated to continue to disclose information. In this manner, broker-dealers may obtain at least some of the information or documentation necessary to be in compliance with SEC Rule 15c2-12 with respect to a municipal bond 532 issued by bond issuer 410.

In some embodiments, user interface 600 may include similar information for a no longer outstanding security 542 (illustrated in FIG. 6 as a security 542A, 542B, . . . , 542N) issued by bond issuer 410. For example, a security 542 may include corresponding information such as a document description 622 (illustrated in FIG. 6 as document description 622A, 622B, . . . , 622N), document type 624 (illustrated in FIG. 6 as document type 624A, 624B, . . . , 624N), document download 626 (illustrated in FIG. 6 as document download 626A, 626B, . . . , 626N), and/or other information associated with a filing requirement related to a no longer outstanding security 542 issued by bond issuer 410.

FIG. 7 illustrates a user interface 700 for displaying checklists of disclosure requirements of muni bonds 532 issued by a bond issuer 410, according to an aspect of the invention. In some embodiments, the disclosure requirements displayed by user interface 700 may be obtained from an official statement from bond issuer 410 with respect to a particular municipal bond 532. For example, the disclosure requirements may be obtained from a continuing disclosure agreement or undertaking made by bond issuer 410 with respect to the particular municipal bond 532 and included with the official statement. In this manner, a user may view requirements with respect to one or more muni bonds 532 issued by bond issuer 410, which in some embodiments was set forth in the official statement by the security issuer.

In some embodiments, each municipal bond 532 may include one or more filing requirements. Accordingly, as illustrated, each municipal bond 532 includes two rows of information that describe two requirements, although each municipal bond 532 may be subject to more or less requirements.

In some embodiments, as illustrated, for each currently outstanding municipal bond 532, user interface 700 may include one or more corresponding document types 712, 722 (illustrated in FIG. 7 as doc type 712A, 722A, 712B, 722B, . . . , 712N, 722N), one or more filing titles 714, 724 (illustrated in FIG. 7 as filing title 714A, 724A, 714B, 724B, . . . , 714N, 724N), one or more filing requirements 716, 726 (illustrated in FIG. 7 as filing title 716A, 726A, 716B, 726B, . . . , 716N, 726N), one or more due dates 718, 728 (illustrated in FIG. 7 as due dates 718A, 728A, 718B, 728B, . . . , 718N, 728N), one or more filing intervals 714, 724 (illustrated in FIG. 7 as filing intervals 720A, 730A, 720B, 730B, . . . , 720N, 730N), and/or other information related to a filing requirement.

User interface 700 may display various documents and disclosures that are required in relation to various municipal bonds 532 issued by bond issuer 410. In some embodiments, the documents and disclosures of the checklist may be listed in the bond issuer's official statement and parsed for presentation by the user interface.

Figure 8:
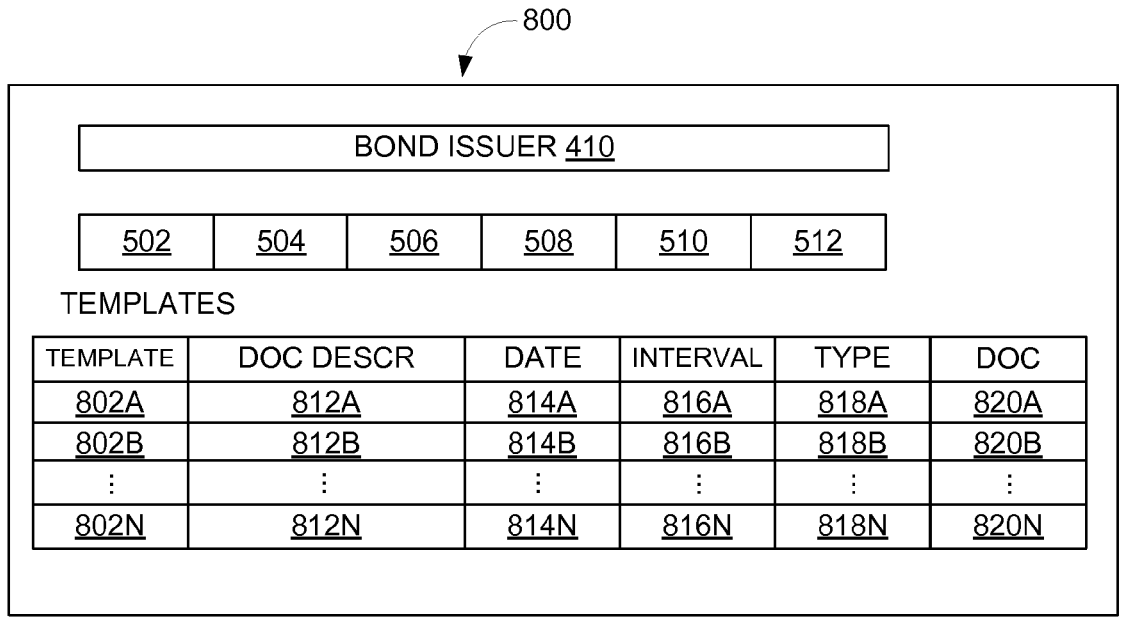
FIG. 8 illustrates a user interface for displaying compliance templates of an obligor used to determine compliance of securities issued by a security issuer, according to an aspect of the invention.

FIG. 8 illustrates a user interface 800 for displaying compliance templates 802 of an obligor used to determine compliance of securities issued by a bond issuer 410, according to an aspect of the invention. Each compliance template 802 (illustrated in FIG. 8 as compliance templates 802A, 802B, . . . , 802N) may describe information required to be disclosed or other requirement.

In some embodiments, as illustrated, for each compliance template 802, user interface 700 may include one or more corresponding document descriptions 812 (illustrated in FIG. 8 as document descriptions 812A, 812B, . . . , 812N), one or more corresponding document dates 814 (illustrated in FIG. 8 as document dates 814A, 814B, . . . , 814N), one or more corresponding filing intervals 816 (illustrated in FIG. 8 as filing intervals 816A, 816B, . . . , 816N), one or more corresponding disclosure types 818 (illustrated in FIG. 8 as disclosure types 818A, 818B, . . . , 818N), one or more corresponding document downloads 820 (illustrated in FIG. 8 as document downloads 820A, 820B, . . . , 820N), and/or other information related to a compliance template.

A compliance template 812 may be viewed and compared to information disclosed by bond issuer 410 with respect to a security. In this manner, disclosures actually made by bond issuer 410 with respect to a security may be compared with information required to be disclosed based on the compliance template.

Figure 9:
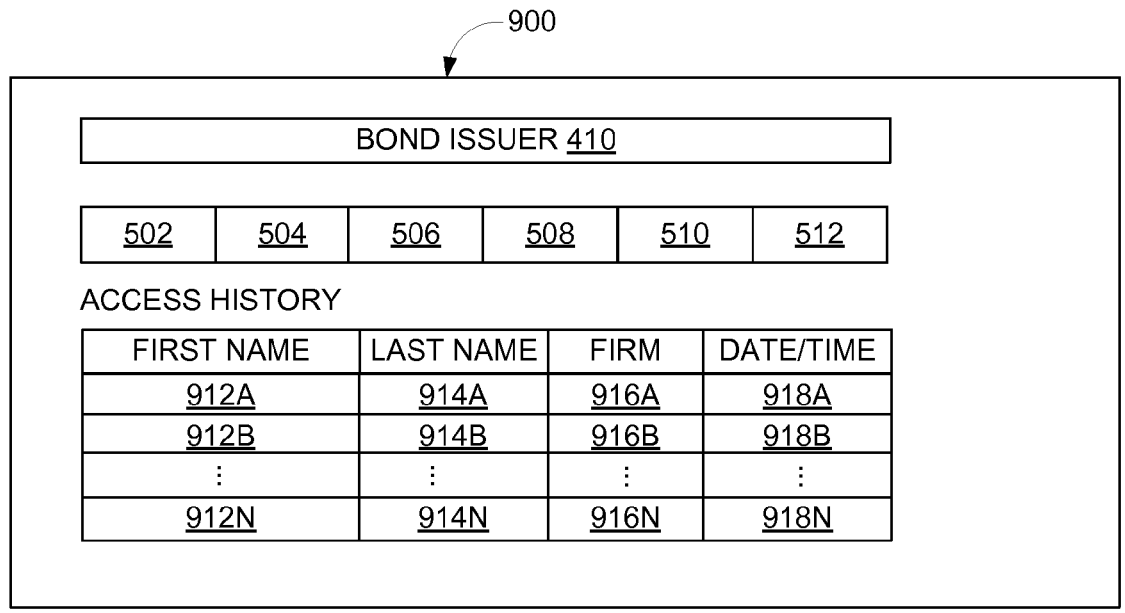
FIG. 9 illustrates a user interface for identifying users who access information related to a security issuer, according to an aspect of the invention.

FIG. 9 illustrates a user interface 900 for identifying users who access information related to a bond issuer 410, according to an aspect of the invention. The accessed information may include the various information described in this disclosure such as, for example, whether a bond issuer has complied with various regulatory requirements, continuing disclosure agreements, and/or other information related to a security issuer.

In some embodiments, user interface 900 may include first names 912 (illustrated in FIG. 9 as first names 912A, 912B, . . . , 912N), last names 914 (illustrated in FIG. 9 as last names 914A, 914B, . . . , 914N), firms/entities 916 (illustrated in FIG. 9 as firms 916A, 916B, . . . , 916N), access dates/times 918 (illustrated in FIG. 9 as dates/times 918A, 918B, . . . , 918N), and/or other information related to identifying users that accessed information related to bond issuer 410.

Compliance server 110 may generate user interface 900 based on a log of user access stored in a memory such as via storage module 112. Each time a user or entity accesses information related to a security issuer, compliance server 110 may store the information displayed by user interface 900 and/or other information related to the access.

Figure 10:
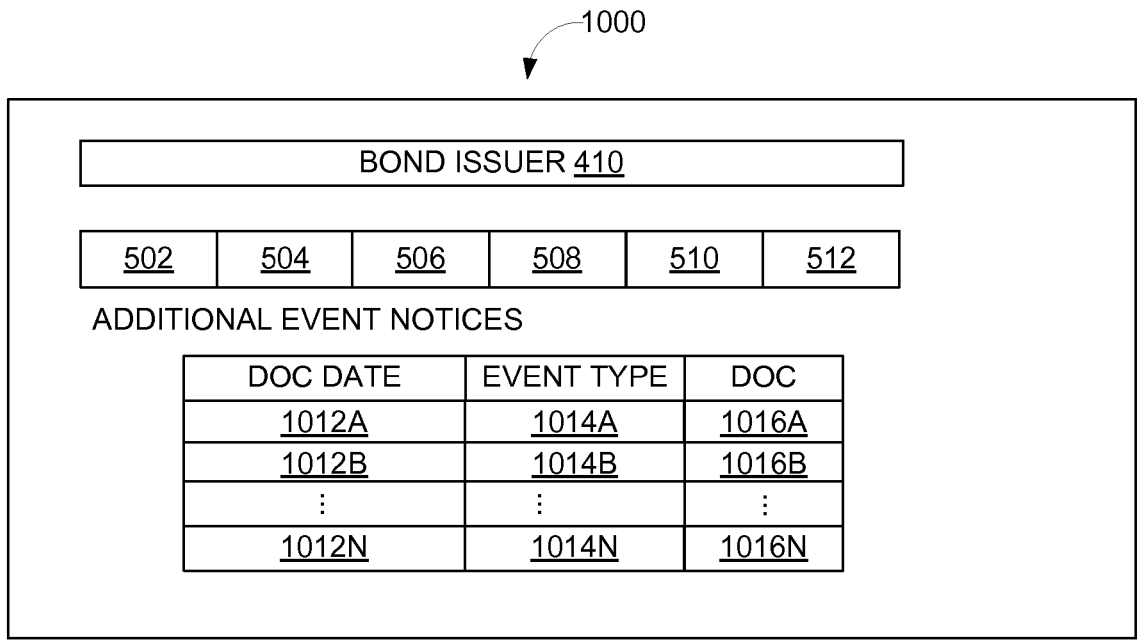
FIG. 10 illustrates a user interface for displaying information related to a bond issuer received from external information sources, according to an aspect of the invention.

FIG. 10 illustrates a user interface 1000 for displaying information related to a bond issuer 410 received from external information sources 150, according to an aspect of the invention. User interface 100 may provide a bond issuer and/or others with information received from different information sources in relation to a bond issuer 410 and/or securities issued by bond issuer 410.

For example, user interface 1000 may include document dates 1012 (illustrated in FIG. 10 as dates 1012A, 1012B, . . . , 1012N), event types 1014 (illustrated in FIG. 10 as types 1014A, 1014B, . . . , 1014N), document downloads 1016 (illustrated in FIG. 10 as downloads 1016A, 1016B, . . . , 1016N), and/or other communication obtained in relation to bond issuer 410.

FIGS. 11-18 illustrate various user interfaces 1100-1800 for individual ones of securities issued by a security issuer. While FIGS. 5-10 illustrate various user interfaces for interacting with information related to a security issuer, FIGS. 11-18 allow drill down views into each individual security issued by a security issuer. For example, selection of an individual municipal bond 532 illustrated in FIG. 4 may cause one of user interfaces 1100-1800 to be displayed. The user interfaces illustrated by FIGS. 11-18 may each include various navigation components used to navigate between different user interfaces 1100-1800 of FIGS. 11-18. For example, navigation component 1102 when selected may cause the display of user interface 1100. Navigation portion 1104 when selected may cause the display of user interface 1200. Navigation portion 1106 when selected may cause the display of user interface 1300. Navigation portion 1108 when selected may cause the display of user interface 1400. Navigation portion 1110 when selected may cause the display of user interface 1500. Navigation portion 1112 when selected may cause the display of user interface 1600. Navigation portion 1114 when selected may cause the display of user interface 1700. Navigation portion 1116 when selected may cause the display of user interface 1800.

Figure 11:
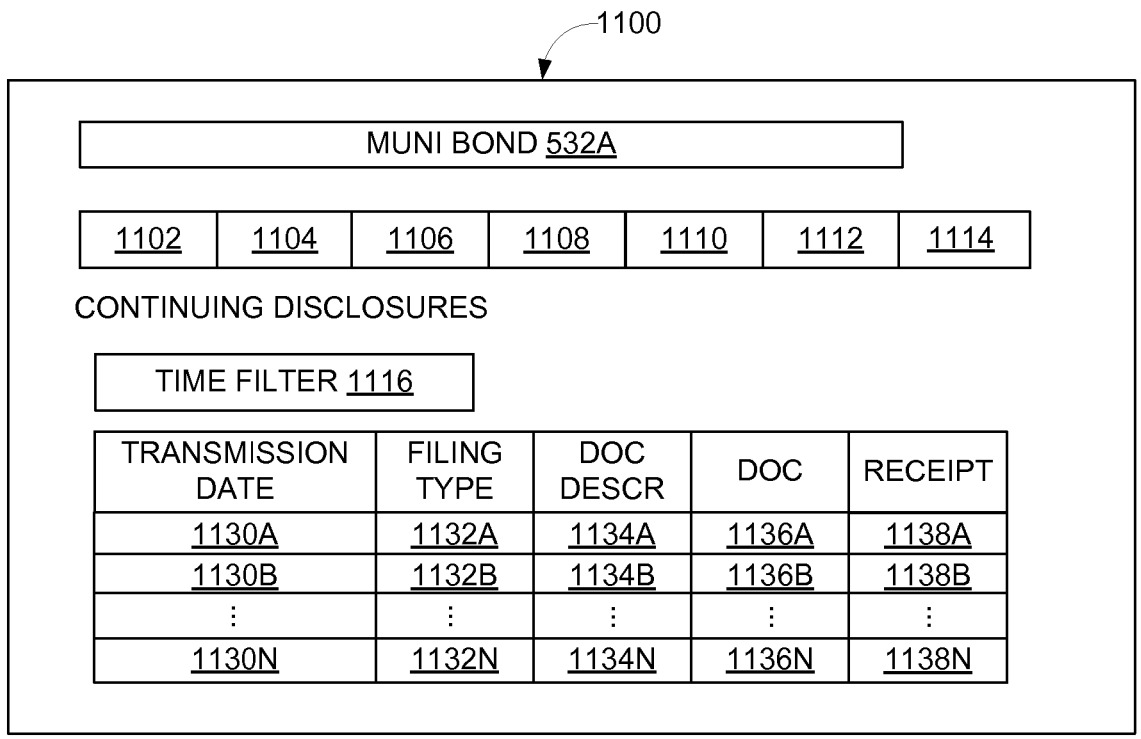
FIG. 11 illustrates a user interface for displaying continuing disclosures related to a security issued by a security issuer, according to an aspect of the invention.

FIG. 11 illustrates a user interface 1100 for displaying continuing disclosures related to a security issued 532 by a security issuer, according to an aspect of the invention. User interface 1100 may provide information related to continuing disclosures for an individual municipal bond 532.

For example, for each continuing disclosure, user interface 1100 may include transmission dates 1120 (illustrated in FIG. 11 as dates 1120A, 1120B, . . . , 1120N), filing types 1122 (illustrated in FIG. 11 as types 1122A, 1122B, . . . , 1122N), document descriptions 1124 (illustrated in FIG. 11 as descriptions 1124A, 1124B, . . . , 1124N), document downloads 1126 (illustrated in FIG. 11 as documents 1126A, 1126B, . . . , 1126N), receipts 1128 (illustrated in FIG. 11 as descriptions 1128A, 1128B, . . . , 1128N), and/or other information related to continuing disclosures for an individual municipal bond 532.

In some embodiments, user interface 1100 may include a filter component 1116, which may allow filtering the continuing disclosures based on a parameter such as time. For example, using filter component 1116, a user may view only those continuing disclosures made within the last five years, last year, this current year, this current month, and/or other time criteria. In this manner, the user may view historical and/or current disclosures made with respect to the individual municipal bond 532.

Figure 12:
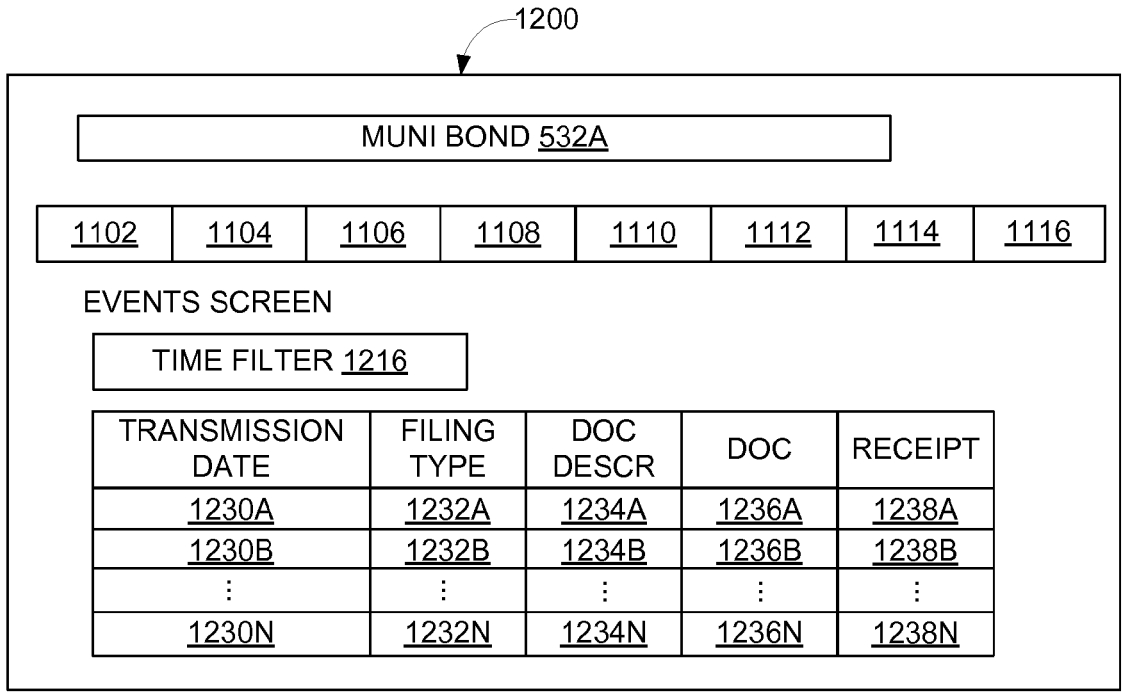
FIG. 12 illustrates a user interface for displaying events related to a security issued by a security issuer, according to an aspect of the invention.

FIG. 12 illustrates a user interface 1200 for displaying events related to an individual municipal bond 532 issued by a security issuer, according to an aspect of the invention. Events may include events that may affect an individual municipal bond 532 such as, for example, a ratings change, a material event, and/or other event that may affect the security. An example of a material event may include a bankruptcy filing by a large employer from a geographic area related to the security. The bankruptcy filing may impact the security issuer's ability to repay, terms for repaying, and/or other impact on the particular security and therefore may be considered a material event.

For each event, user interface 1200 may include transmission dates 1230 (illustrated in FIG. 12 as dates 1230A, 1230B, . . . , 1230N), filing types 1232 (illustrated in FIG. 12 as types 1232A, 1232B, . . . , 1232N), document descriptions 1234 (illustrated in FIG. 12 as descriptions 1234A, 1234B, . . . , 1234N), document downloads 1236 (illustrated in FIG. 12 as documents 1236A, 1236B, . . . , 1236N), receipts 1238 (illustrated in FIG. 12 as receipts 1238A, 1238B, . . . , 1238N), and/or other information related to filing requirements for an individual municipal bond 532.

In some embodiments, user interface 1200 may include a filter component 1216, which may allow filtering the events based on a parameter such as time. For example, using filter component 1216, a user may view only those events that occurred within the last five years, last year, this current year, this current month, and/or other time criteria. In this manner, the user may view historical and/or current events with respect to the individual municipal bond 532.

Figure 13:
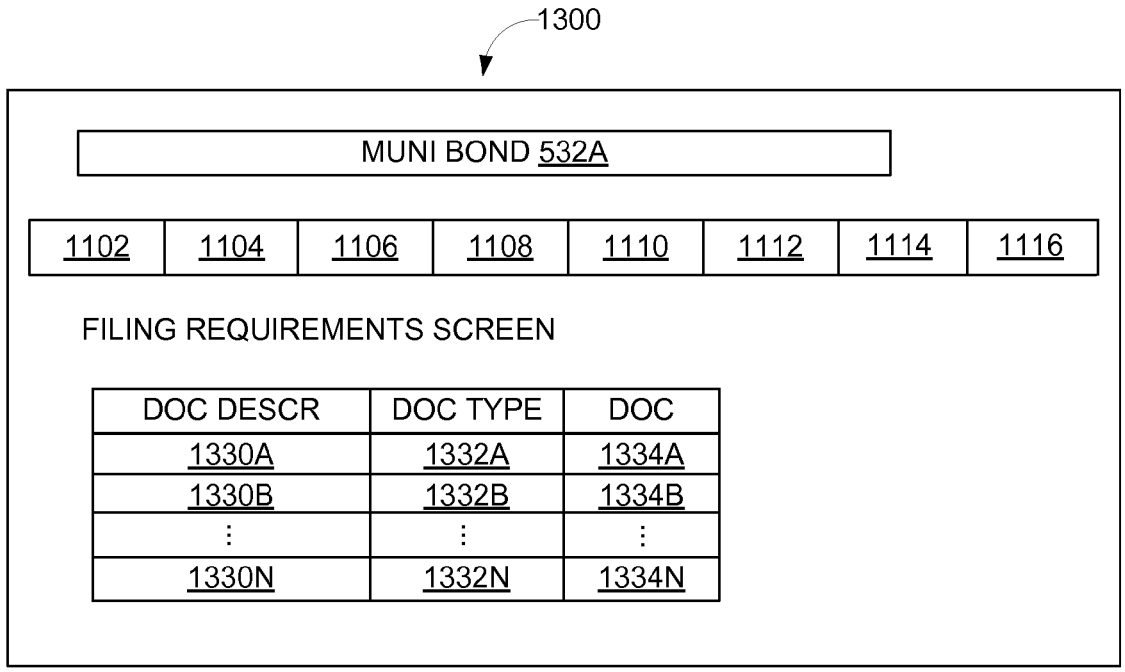
FIG. 13 illustrates a user interface for displaying filing requirements related to a security issued by a security issuer, according to an aspect of the invention.

FIG. 13 illustrates a user interface for displaying filing requirements related to an individual municipal bond 532 issued by a security issuer, according to an aspect of the invention. For each filing requirement, user interface 1300 may include document descriptions 1330 (illustrated in FIG. 13 as descriptions 1330A, 1330B, . . . , 1330N), document types 1332 (illustrated in FIG. 13 as types 1332A, 1332B, . . . , 1332N), document downloads 1334 (illustrated in FIG. 13 as documents 1334A, 1334B, . . . , 1334N), and/or other information related to filing requirements for an individual municipal bond 532.

FIG. 14 illustrates a user interface 1400 for displaying a checklist of disclosure requirements related to an individual municipal bond 532 issued by a security issuer, according to an aspect of the invention.

For each checklist item, user interface 1400 may include document types 1430 (illustrated in FIG. 14 as types 1430A, 1430B, . . . , 1430N), filing titles 1432 (illustrated in FIG. 14 as titles 1432A, 1432B, . . . , 1432N), filing requirements 1434 (illustrated in FIG. 14 as documents 1434A, 1434B, . . . , 1434N), due dates 1436 (illustrated in FIG. 14 as due dates 1436A, 1436B, . . . , 1436N), filing intervals 1438 (illustrated in FIG. 14 as intervals 1438A, 1438B, . . . , 1438N), and/or other information related to filing requirements for an individual municipal bond 532.

FIG. 15 illustrates a user interface 1500 for displaying CUSIPs related to an individual municipal bond 532 issued by a security issuer, according to an aspect of the invention. For each CUSIP of an individual municipal bond 532, user interface 1500 may include CUSIPs 1530 (illustrated in FIG. 15 as CUSIPs 1530A, 1530B, . . . , 1530N), maturity dates 1532 (illustrated in FIG. 15 as maturity dates 1532A, 1532B, . . . , 1532N), maturity sizes 1534 (illustrated in FIG. 15 as maturity sizes 1534A, 1534B, . . . , 1534N), credit supports 1536 (illustrated in FIG. 15 as credit supports 1536A, 1536B, . . . , 1536N), and/or other information related to CUSIPs for an individual municipal bond 532.

Figure 16:
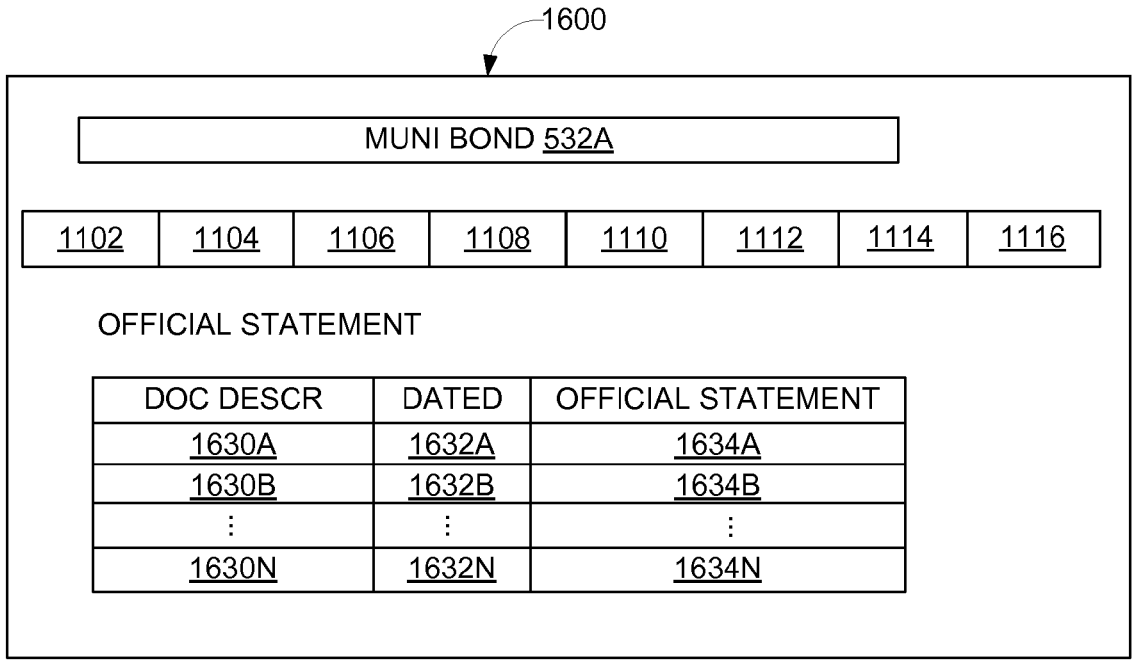
FIG. 16 illustrates a user interface for displaying official statements related to a security issued by a security issuer, according to an aspect of the invention.

FIG. 16 illustrates a user interface 1600 for displaying official statements related to an individual security issued 532 by a security issuer, according to an aspect of the invention. For each official statement of an individual municipal bond 532, user interface 1600 may include document descriptions 1630 (illustrated in FIG. 16 as descriptions 1630A, 1630B, . . . , 1630N), document dates 1632 (illustrated in FIG. 16 as dates 1632A, 1632B, . . . , 1632N), official statement downloads 1634 (illustrated in FIG. 16 as official statements 1634A, 1634B, . . . , 1634N), and/or other information related to official statements of an individual municipal bond 532.

Figure 17:
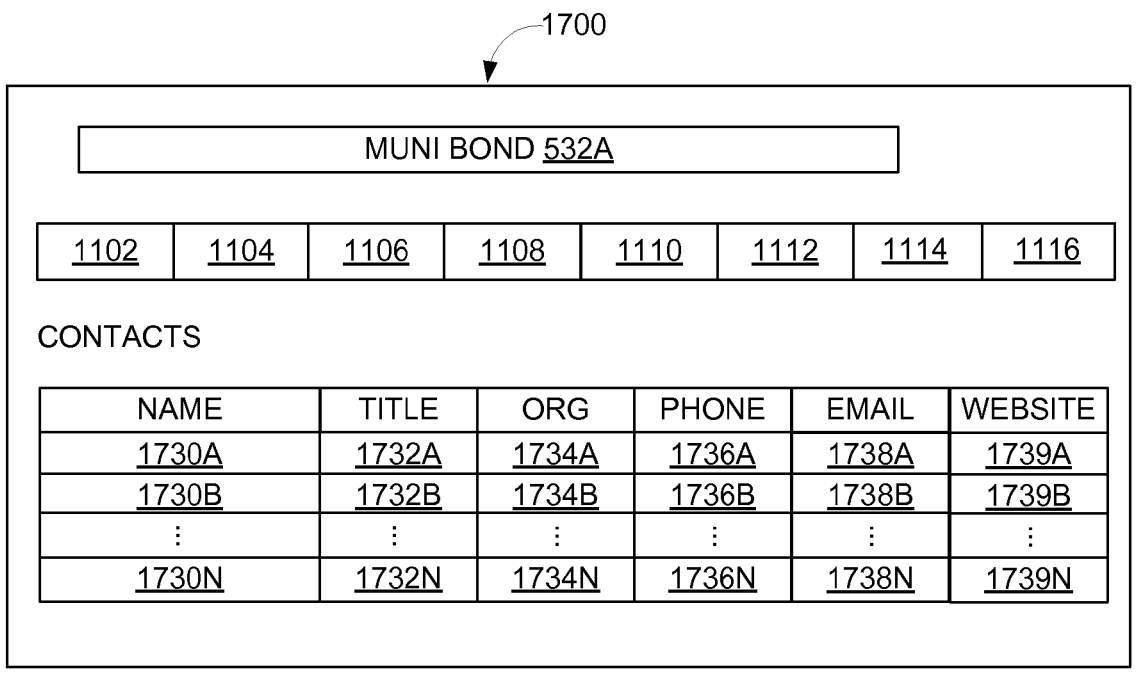
FIG. 17 illustrates a user interface for displaying contacts related to a security issued by a security issuer, according to an aspect of the invention.

FIG. 17 illustrates a user interface 1700 for displaying contacts related to an individual security issued 532 by a security issuer, according to an aspect of the invention. For each contact of an individual municipal bond 532, user interface 1700 may include names 1730 (illustrated in FIG. 17 as names 1730A, 1730B, . . . , 1730N), titles 1732 (illustrated in FIG. 17 as titles 1732A, 1732B, . . . , 1732N), organizations 1734 (illustrated in FIG. 17 as organizations 1734A, 1734B, . . . , 1734N), telephone numbers 1736 (illustrated in FIG. 17 as phone 1736A, 1736B, . . . , 1736N), email addresses 1738 (illustrated in FIG. 17 as email 1738A, 1738B, . . . , 1738N), website 1740 (illustrated in FIG. 17 as website 1740A, 1740B, . . . , 1740N), and/or other information related to contacts for an individual municipal bond 532.

Figure 18:
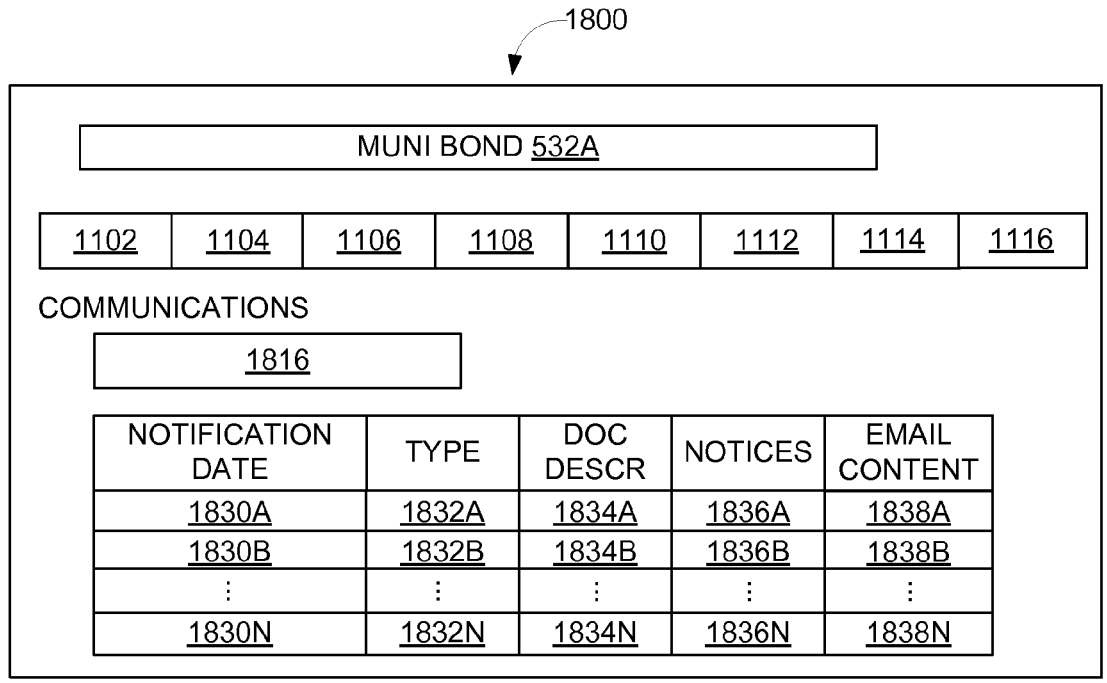
FIG. 18 illustrates a user interface for displaying communications for a security issuer, according to an aspect of the invention.

FIG. 18 illustrates a user interface 1800 for displaying communications for a security cin relation to an individual security, according to an aspect of the invention. For each communication, user interface 1800 may include notification dates 1830 (illustrated in FIG. 18 as names 1830A, 1830B, . . . , 1830N), event types 1832 (illustrated in FIG. 18 as types 1832A, 1832B, . . . , 1832N), document descriptions 1834 (illustrated in FIG. 18 as document descriptions 1834A, 1834B, . . . , 1834N), downloadable actual notices 1836 (illustrated in FIG. 18 as notices 1836A, 1836B, . . . , 1836N), email contents 1838 (illustrated in FIG. 18 as email content 1740A, 1740B, . . . , 1740N), website 1740 (illustrated in FIG. 17 as website 1740A, 1740B, . . . , 1740N), and/or other information related to contacts for an individual municipal bond 532.

Figure 19:
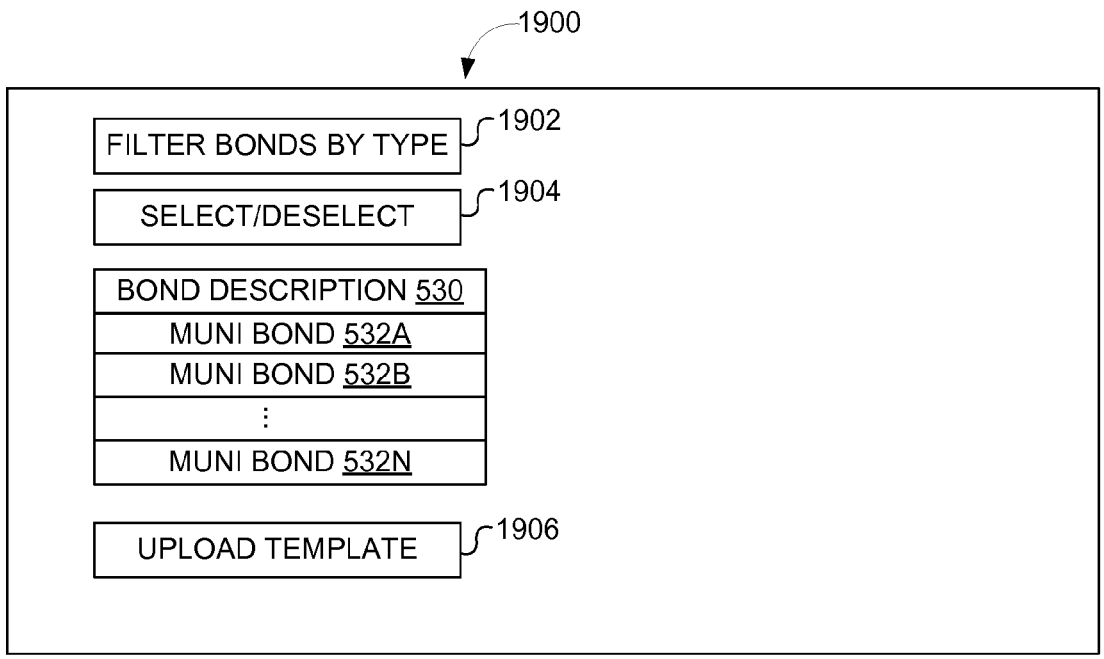
FIG. 19 illustrates a user interface for uploading information to be checked for compliance with regulatory requirements, according to an aspect of the invention.

FIG. 19 illustrates a user interface 1900 for uploading information to be checked for compliance with regulatory requirements, according to an aspect of the invention. In some embodiments, user interface 1900 may include a search portion 1902 that allows a user to search for an individual security and/or security issuer. In some embodiments, user interface 1900 may include a selection portion 1904 that allows a user to select or deselect one or more individual securities and/or security issuers listed in a results portion 1906. In some embodiments, user interface 1900 may include an upload portion 1908 that allows a user to upload information to be checked for compliance with regulatory requirements in relation to the selected (or not deselected) individual securities and/or security issuers. In some embodiments, the information may be uploaded in various formats such as, for example, a spreadsheet, and/or other automatically readable format.

In some embodiments, the uploaded information may be communicated via user interface 1900 to compliance server 110, where the uploaded information may be checked for compliance with respect to the selected individual securities. In some embodiments, the requirements may be included in one or more compliance templates. A compliance template may include various headers, fields, and/or other indicators that indicate information that is required to be disclosed. The requirements may be obtained from, for example, a continuing disclosure agreement that obligates the bond issuer to continue to disclose required information such as financial statements, material events, and/or other required disclosures. In these embodiments, the uploaded information such as a spreadsheet may include headers, fields, and/or other indicators that correspond to the compliance template so that compliance server 110 may determine whether the required information is included in the uploaded information based on a comparison with the one or more compliance templates.

For example, a user may generate a spreadsheet that includes financial information that may be required as part of a continuing disclosure agreement related to an individual security issued by a security issuer. The user may upload the spreadsheet in an attempt to fulfill a security issuer's continuing disclosure obligations related to an individual security. Compliance server 110 may automatically determine whether the spreadsheet includes all of the required information per the continuing disclosure agreement, which compliance server 110 may have already received and parsed into a compliance template that includes the requirements set forth therein.

Various messages may be communicated via the user interface 1900 that indicates which, if any, required information is missing. If all requirements have been satisfied by the information included with the spreadsheet, a "no action required" and/or other indication that the uploaded information complies with the requirements may be provided. In this manner, user interface 1900 may be used by a user to determine whether uploaded information is sufficient to satisfy one or more regulatory requirements with respect to an individual security (or portions thereof) issued by a security issuer.

In some embodiments, a compliance template may be created by a system administrator of compliance server 110. In some embodiments, a compliance template may be created by others such as a bond issuer to encode various requirements. For example, a bond issuer may be obligated under various terms of a continuing disclosure agreement. In order to facilitate efficient compliance checking, the bond issuer may generate a compliance template that codifies (e.g., allows automatic checking by compliance server 110) the various disclosure obligations.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to provide information related to compliance of bond issuers with one or more regulatory requirements governing municipal bonds, the system comprising:
    a computer system comprising one or more physical processors programmed to execute one or more computer program instructions which, when executed, cause the computer system to:
        receive, via a graphical user interface, a selection of a bond issuer;
        obtain, from data storage in operative communication with the computer system, securities information associated with a portfolio of the selected bond issuer, the portfolio comprising each bond associated with the selected bond issuer;
        determine, based on the obtained securities information, for each bond associated with the selected bond issuer: i) a current compliance status of the selected bond issuer with one or more regulatory requirements for a current year; and ii) a historical compliance status of the selected bond issuer with the one or more regulatory requirements for one or more previous years;
        display, in a common view of the graphical user interface, for each bond associated with the selected bond issuer: i) a graphical indicator that depicts the determined current compliance status of the selected bond issuer for the current year; and ii) a graphical indicator that depicts the determined historical compliance status of the selected bond issuer for each of the one or more previous years; and
        responsive to receipt of a selection of a first selectable interface component displayed in the common view of the graphical user interface, retrieve and display, for each bond associated with the selected bond issuer, an identification of any applicable continuing disclosure requirement.

2. The system of claim 1, wherein the computer system is caused to determine the current compliance status of the selected bond issuer and the historical compliance status of the selected bond issuer by comparing the obtained securities information for each of the one or more regulatory requirements to a corresponding compliance template, wherein each compliance template specifies required information specific to its corresponding regulatory requirement.

3. The system of claim 1, wherein the computer system is further caused to display a due date and filing interval for each identified applicable continuing disclosure requirement.

4. The system of claim 1, wherein the computer system is further caused to:
    responsive to receipt of a selection of a second selectable interface component displayed in the common view of the graphical user interface, retrive and display, for each bond associated with the selected bond issuer: i) a description of a continuing disclosure agreement that forms a contractual basis for any applicable identified continuing disclosure requirement; and ii) a selectable link to access the continuing disclosure agreement.

5. The system of claim 1, wherein the computer system is further caused to:
    responsive to receipt of a selection of a second selectable interface component displayed in the common view of the graphical user interface, retrieve and display, for the selected bond issuer, a compliance template specifying required information specific to one or more regulatory requirements.

6. The system of claim 1, wherein the computer system is further caused to:
    responsive to receipt of a selection of a second selectable interface component displayed in the common view of the graphical user interface, retrieve and display, for the selected bond issuer, a list identifying i) user name, ii) access date, and iii) access time for any computer system user that has accessed information for the selected bond issuer.

7. The system of claim 1, wherein the computer system is further caused to:
    receive, via the graphical user interface, a selection of a bond from the portfolio associated with the selected bond issuer; and display, in a common bond view of the graphical user interface, for the selected bond, a list of all disclosure documents that have been transmitted to a repository.

8. The system of claim 7, wherein the computer system is further caused to:
display, for each listed disclosure document: i) a transmission date; ii) a selectable link to access the disclosure document; and ii) a selectable link to access a receipt from the repository acknowledging receipt of the disclosure document.

9. The system of claim 7, wherein the computer system is further caused to:
responsive to receipt of a selection of a first selectable interface component displayed in the common bond view of the graphical user interface, display, for the selected bond, a list of all material event notices that have been transmitted to a repository.

10. The system of claim 9, wherein the computer system is further caused to:
display, for each listed material event notice: i) a transmission date; ii) a selectable link to access the material event notice; and ii) a selectable link to access a receipt from the repository acknowledging receipt of the material event notice.

11. The system of claim 7, wherein the computer system is further caused to:
responsive to receipt of a selection of a first selectable interface component displayed in the common bond view of the graphical user interface, display for the selected bond: i) a description of a continuing disclosure agreement; and ii) a selectable link to access the continuing disclosure agreement.

12. The system of claim 7, wherein the computer system is further caused to:
responsive to receipt of a selection of a first selectable interface component displayed in the common bond view of the graphical user interface, display for the selected bond: i) an identification of any applicable continuing disclosure requirements; and ii) a due date and filing interval for each identified applicable continuing disclosure requirement.

13. The system of claim 7, wherein the computer system is further caused to:
responsive to receipt of a selection of a first selectable interface component displayed in the common bond view of the graphical user interface, display Committee on Uniform Securities identification Procedures (CUSIP) numbers for the selected bond.

14. The system of claim 7, wherein the computer system is further caused to:
responsive to receipt of a selection of a first selectable interface component displayed in the common bond view of the graphical user interface, display: i) an official statement for the selected bond; and ii) a selectable link to access the official statement.

15. A computer-implemented method of providing information related to compliance of bond issuers with one or more regulatory requirements governing municipal bonds, the method being implemented by a computer system that comprises one or more physical processors executing one or more computer program instructions which, when executed, perform the method, the method comprising:
receiving by the computer system, via a graphical user interface, a selection of a bond issuer;
obtaining by the computer system, from data storage in operative communication with the computer system, securities information associated with a portfolio of the selected bond issuer, the portfolio comprising each bond associated with the selected bond issuer;
determining by the computer system, based on the obtained securities information, for each bond associated with the selected bond issuer: i) a current compliance status of the selected bond issuer with one or more regulatory requirements for a current year; and ii) a historical compliance status of the selected bond issuer with the one or more regulatory requirements for one or more previous years;
displaying, by the computer system, in a common view of the graphical user interface, for each bond associated with the selected bond issuer: i) a graphical indicator that depicts the determined current compliance status of the selected bond issuer for the current year; and ii) a graphical indicator that depicts the determined historical compliance status of the selected bond issuer for each of the one or more previous years; and
responsive to receipt of a selection of a first selectable interface component displayed in the common view of the graphical user interface, retrieving by the computer system, and displaying, for each bond associated with the selected bond issuer, an identification of any applicable continuing disclosure requirement.

16. The method of claim 15, wherein determining by the computer system, based on the obtained securities information, for each bond associated with the selected bond issuer: i) a current compliance status of the selected bond issuer with one or more regulatory requirements for a current year; and ii) a historical compliance status of the selected bond issuer with the one or more regulatory requirements for one or more previous years, further comprises:
comparing the obtained securities information for each of the one or more regulatory requirements to a corresponding compliance template, wherein each compliance template specifies required information specific to its corresponding regulatory requirement.

17. The method of claim 15, wherein retrieving by the computer system, and displaying, for each bond associated with the selected bond issuer, an identification of any applicable continuing disclosure requirements further comprises:
displaying a due date and filing interval for each identified applicable continuing disclosure requirement.

18. The method of claim 15, further comprising:
responsive to receipt of a selection of a second selectable interface component displayed in the common view of the graphical user interface, retrieving by the computer system, and displaying, for each bond associated with the selected bond issuer: i) a description of a continuing disclosure agreement that forms a contractual basis for any applicable identified continuing disclosure requirement; and ii) a selectable link to access the continuing disclosure agreement.

19. The method of claim 15, further comprising:
responsive to receipt of a selection of a second selectable interface component displayed in the common view of the graphical user interface, retrieving by the computer system, and displaying, for the selected bond issuer, a compliance template specifying required information specific to one or more regulatory requirements.

20. The method of claim 15, further comprising:
responsive to receipt of a selection of a second selectable interface component displayed in the common view of the graphical user interface, retrieving by the computer system, and displaying, for the selected bond issuer, a list identifying i) user name, ii) access date, and iii)

access time for any computer system user that has accessed information for the selected bond issuer.

21. The method of claim 15, further comprising:
receiving by the computer system, via the graphical user interface, a selection of a bond from the portfolio associated with the selected bond issuer; and
displaying by the computer system, in a common bond view of the graphical user interface, for the selected bond, a list of all disclosure documents that have been transmitted to a repository.

22. The method of claim 21, further comprising:
displaying by the computer system, for each listed disclosure document: i) a transmission date; ii) a selectable link to access the disclosure document; and ii) a selectable link to access a receipt from the repository acknowledging receipt of the disclosure document.

23. The method of claim 21, further comprising:
responsive to receipt of a selection of a first selectable interface component displayed in the common bond view of the graphical user interface, displaying by the computer system, for the selected bond, a list of all material event notices that have been transmitted to a repository.

24. The method of claim 23, further comprising:
displaying by the computer system, for each listed material event notice: i) a transmission date; ii) a selectable link to access the material event notice; and ii) a selectable link to access a receipt from the repository acknowledging receipt of the material event notice.

25. The method of claim 21, further comprising:
responsive to receipt of a selection of a first selectable interface component displayed in the common bond view of the graphical user interface, displaying by the computer system, for the selected bond: i) a description of a continuing disclosure agreement; and ii) a selectable link to access the continuing disclosure agreement.

26. The method of claim 21, further comprising:
responsive to receipt of a selection of a first selectable interface component displayed in the common bond view of the graphical user interface, displaying by the computer system, for the selected bond: i) an identification of any applicable continuing disclosure requirements; and ii) a due date and filing interval for each identified applicable continuing disclosure requirement.

27. The method of claim 21, further comprising:
responsive to receipt of a selection of a first selectable interface component displayed in the common bond view of the graphical user interface, displaying by the computer system Committee on Uniform Securities identification Procedures (CUSIP) numbers for the selected bond.

28. The method of claim 21, further comprising:
responsive to receipt of a selection of a first selectable interface component displayed in the common bond view of the graphical user interface, displaying by the computer system: i) an official statement for the selected bond; and ii) a selectable link to access the official statement.

* * * * *